US011276063B2

(12) United States Patent
Kohli

(10) Patent No.: US 11,276,063 B2
(45) Date of Patent: Mar. 15, 2022

(54) SYSTEM AND METHOD FOR LINKING BILL PAYMENT SERVICE WITH REMITTANCE

(71) Applicant: MasterCard International Incorporated, Purchase, NY (US)

(72) Inventor: Manoneet Kohli, O Fallon, MO (US)

(73) Assignee: MASTERCARD INTERNATIONAL INCORPORATED, Purchase, NY (US)

( * ) Notice: Subject to any disclaimer, the term of this patent is extended or adjusted under 35 U.S.C. 154(b) by 0 days.

(21) Appl. No.: 16/747,102

(22) Filed: Jan. 20, 2020

(65) Prior Publication Data

US 2020/0151731 A1   May 14, 2020

Related U.S. Application Data

(62) Division of application No. 15/276,778, filed on Sep. 26, 2016, now Pat. No. 10,558,977.

(51) Int. Cl.
| | |
|---|---|
| *G06Q 40/06* | (2012.01) |
| *G06Q 20/40* | (2012.01) |
| *G06Q 40/00* | (2012.01) |
| *G06Q 30/06* | (2012.01) |
| *G06Q 30/04* | (2012.01) |
| *G06Q 20/10* | (2012.01) |

(Continued)

(52) U.S. Cl.
CPC ..... *G06Q 20/40145* (2013.01); *G06Q 20/102* (2013.01); *G06Q 20/322* (2013.01); *G06Q 20/382* (2013.01); *G06Q 30/04* (2013.01); *G06Q 30/0609* (2013.01); *G06Q 40/00* (2013.01)

(58) Field of Classification Search
CPC ........... G06Q 20/40145; G06Q 20/102; G06Q 20/322; G06Q 20/382; G06Q 30/04; G06Q 30/0609; G06Q 40/00
See application file for complete search history.

(56) References Cited

U.S. PATENT DOCUMENTS

| | | |
|---|---|---|
| 5,699,528 A | 12/1997 | Hogan |
| 6,636,833 B1 | 10/2003 | Flitcroft et al. |

(Continued)

FOREIGN PATENT DOCUMENTS

| | | | |
|---|---|---|---|
| JP | 2015062125 A | * | 4/2015 |
| WO | WO2015123378 | | 8/2015 |
| WO | WO2018057131 | | 3/2018 |

OTHER PUBLICATIONS

Krista Becker, Mobile Phone: The New Way to Pay?, Feb. 2007, Federal Reserve Bank of Boston, web, 1-11 (Year: 2007).*
James Wayman et al, An Introduction to Biometric Authentication Systems. Biometric Systems, 2005. pp. 1-20.

(Continued)

*Primary Examiner* — I Jung Liu
(74) *Attorney, Agent, or Firm* — Otterstedt, Wallace & Kammer, LLP

(57) ABSTRACT

An enrollment of a receiver in a biometric authentication system is obtained. The receiver is challenged with a pre-remittance biometric challenge from the biometric authentication system prior to initiating a remittance to the receiver. An indication is obtained that the remittance has at least been initiated to a financial account of the receiver. The indication includes successful completion of the pre-remittance biometric challenge by the receiver. Responsive to obtaining the indication, at least one payee is automatically paid from the financial account.

1 Claim, 12 Drawing Sheets

(51) Int. Cl.
*G06Q 20/32* (2012.01)
*G06Q 20/38* (2012.01)

(56) References Cited

U.S. PATENT DOCUMENTS

| | | | |
|---|---|---|---|
| 7,136,835 | B1 | 11/2006 | Flitcroft et al. |
| 8,706,633 | B2 | 4/2014 | Hagmeier |
| 9,058,580 | B1 * | 6/2015 | Amtrup ............ G06Q 10/06316 |
| 9,928,028 | B2 | 3/2018 | Jung et al. |
| 10,558,977 | B2 | 2/2020 | Kohli |
| 2003/0097596 | A1 * | 5/2003 | Muratov ............... G06F 21/575 |
| | | | 726/26 |
| 2004/0139000 | A1 | 7/2004 | Amos |
| 2005/0035193 | A1 | 2/2005 | Gustin et al. |
| 2008/0249929 | A1 | 10/2008 | Hill |
| 2008/0270301 | A1 * | 10/2008 | Jones .................. G06Q 20/425 |
| | | | 705/41 |
| 2010/0100480 | A1 | 4/2010 | Altman et al. |
| 2011/0251952 | A1 | 10/2011 | Kelly et al. |
| 2012/0197788 | A1 | 8/2012 | Sanghvi et al. |
| 2013/0151408 | A1 | 7/2013 | Hill et al. |
| 2013/0290177 | A1 | 10/2013 | Milam et al. |
| 2013/0311362 | A1 | 11/2013 | Milam et al. |
| 2014/0156484 | A1 | 6/2014 | Chan |
| 2014/0180926 | A1 | 6/2014 | Rethorn |
| 2014/0214677 | A1 | 7/2014 | Hagmeier |
| 2016/0034889 | A1 | 2/2016 | Downs et al. |
| 2019/0332680 | A1 | 10/2019 | Wang et al. |

OTHER PUBLICATIONS

James Wayman et al, Biometric Systems. Springer-Verlag London Limited 2005. pp. 1-12.
Biometrics. Downloaded from https://en.wikipedia.org/wiki/Biometrics on May 22, 2016. pp. 1-14.
MasterCard Send™ Platform for You to Send Money Online. Downloaded from https://www.mastercard.us/enus/issuers/productsandsolutions/customerneeds/consumersolutions/mastercardsend.html on Mar. 29, 2016. pp. 1-5.
Digital Payments Just Got Personal. https://www.mastercard.us/content/dam/.../mastercard-send-infographic-2-26-16.pdf. p. 1.
Remittance Services The Cheapest Way for You to Transfer Money Internationally. Downloaded from https://www.mastercard.us/enus/issuers/productsandsolutions/customerneeds/consumersolutions/crossborderremittances.html. on Mar. 29, 2016. pp. 1-3.
Authentication Overview. Downloaded from https://uidai.gov.in/auth.html on May 12, 2016. pp. 1-4.
Remittance, From Wikipedia, the free encyclopedia, Aug. 16, 2016 downloaded from https://en.wikipedia.org/wiki/Remittance, pp. 1-9.
Authorized Officer Bastien Peelen, EPO as ISA, Written Opinion of the ISA, pp. 1-6, counterpart PCT application PCT/US2017/045712, dated Oct. 9, 2017.
Authorized Officer Bastien Peelen, EPO as ISA, International search report, pp. 1-6, counterpart PCT application PCT/US2017/045712, dated Oct. 9, 2017.
Vishal Shukla, Intellectual Property India, Examination Report dated Feb. 24, 2021 in Counterpart Indian Case 201917011726, pp. 1-6.

* cited by examiner

SYSTEM AND METHOD FOR LINKING BILL PAYMENT SERVICE WITH REMITTANCE

CROSS-REFERENCE TO RELATED APPLICATIONS

This patent application is a divisional of U.S. patent application Ser. No. 15/276,778, filed Sep. 26, 2016, entitled SYSTEM AND METHOD FOR LINKING BILL PAYMENT SERVICE WITH REMITTANCE, the complete disclosure of which is expressly incorporated herein by reference in its entirety for all purposes.

FIELD OF THE INVENTION

The present invention relates generally to the electronic and computer arts, and, more particularly, to computer networks for secure electronic funds transfer, bill payment, and the like.

BACKGROUND OF THE INVENTION

In many countries, overseas remittances are a significant source of income for the recipient. The remittance amount is typically used by the receiver for important purposes such as paying bills, making required monthly payments, and the like. In many cases, bill payment enrollment and/or presentment are fixed and/or automated against the user (e.g., remittance receiver's) financial instrument (e.g., checking or other bank account) on fixed dates. A lack of funds in the recipient's registered instrument (e.g., checking or other bank account) on those dates leads to declines and/or penalty charges, and also impacts credit records negatively for the user(s). In other cases, physical distances between the remittance fund receiver and bill payment authority might lead to a delay in payments.

SUMMARY OF THE INVENTION

Principles of the present invention provide techniques for linking a bill payment service with remittance(s). In one aspect, an exemplary system, according to an aspect of the invention, includes a bill payment system; a remittance system; an authentication system; and a workflow engine which couples the bill payment system, the remittance system, and the authentication system. The remittance system sends a remittance to a financial account of a receiver. Prior to the remittance system sending the remittance, the authentication system challenges the receiver with a pre-remittance biometric challenge. Successful completion of the pre-remittance biometric challenge by the receiver is signaled by the authentication system to the bill payment system via the workflow engine. Responsive to the signal, the bill payment system automatically pays at least one payee from the financial account.

In another aspect, an exemplary method, according to an aspect of the invention, includes obtaining, from a receiver, an enrollment of the receiver in a biometric authentication system; challenging the receiver with a pre-remittance biometric challenge from the biometric authentication system prior to initiating a remittance to the receiver; obtaining an indication that the remittance has at least been initiated to a financial account of the receiver, the indication including successful completion of the pre-remittance biometric challenge by the receiver; and, responsive to obtaining the indication, automatically paying at least one payee from the financial account.

Aspects of the invention contemplate the method(s) described herein performed by one or more entities herein, as well as facilitating of one or more method steps by the same or different entities. As used herein, "facilitating" an action includes performing the action, making the action easier, helping to carry the action out, or causing the action to be performed. Thus, by way of example and not limitation, instructions executing on one processor might facilitate an action carried out by instructions executing on a remote processor, by sending appropriate data or commands to cause or aid the action to be performed. For the avoidance of doubt, where an actor facilitates an action by other than performing the action, the action is nevertheless performed by some entity or combination of entities.

One or more embodiments of the invention or elements thereof can be implemented in the form of a computer program product including a tangible computer readable recordable storage medium with computer usable program code for performing the method steps indicated stored thereon in a non-transitory manner. Furthermore, one or more embodiments of the invention or elements thereof can be implemented in the form of a system (or apparatus) including a memory and at least one processor that is coupled to the memory and operative to perform exemplary method steps (e.g., when instructions from a persistent storage device are loaded into the memory to configure the processor). Yet further, in another aspect, one or more embodiments of the invention or elements thereof can be implemented in the form of means for carrying out one or more of the method steps described herein; the means can include (i) specialized hardware module(s), (ii) software module(s) stored in a non-transitory manner in a tangible computer-readable recordable storage medium (or multiple such media) and implemented on a hardware processor, or (iii) a combination of (i) and (ii); any of (i)-(iii) implement the specific techniques set forth herein. Transmission medium(s) per se and disembodied signals per se are defined to be excluded from the claimed means.

One or more embodiments of the invention can provide substantial beneficial technical effects, such as enhanced security, as will be appreciated by the skilled artisan from the discussion herein.

These and other features and advantages of the present invention will become apparent from the following detailed description of illustrative embodiments thereof, which is to be read in connection with the accompanying drawings.

DETAILED DESCRIPTION OF PREFERRED EMBODIMENTS

Payment Devices and Associated Payment Processing Networks

Figure 1:
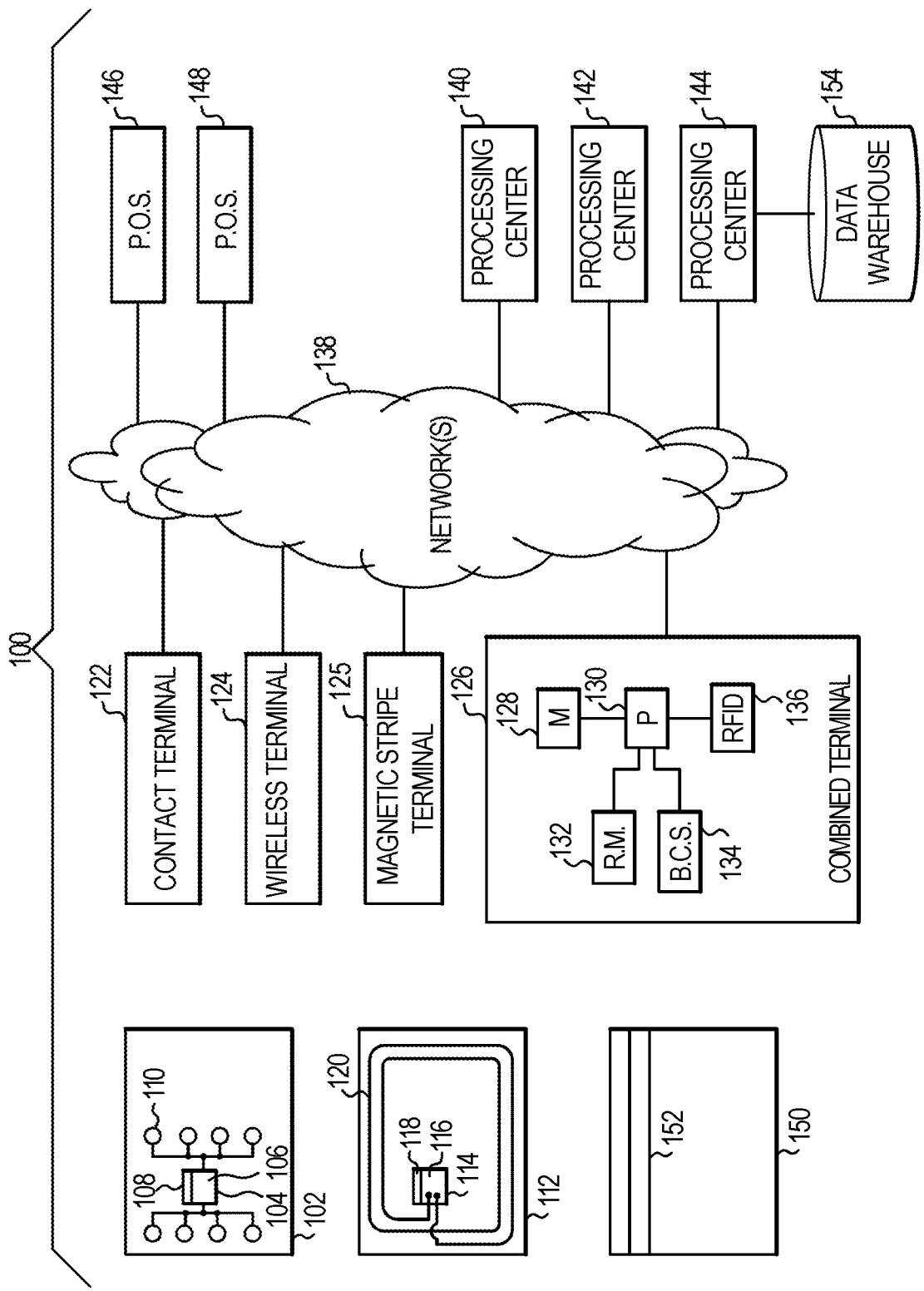
FIG. 1 shows an example of a system and various components thereof that can implement at least a portion of some techniques of the invention.

With regard to payment card and similar payments, attention should now be given to FIG. 1, which depicts an exemplary embodiment of a system 100, according to an aspect of the invention, and including various possible components of the system. System 100 can include one or more different types of portable payment devices. For example, one such device can be a contact device such as card 102. Card 102 can include an integrated circuit (IC) chip 104 having a processor portion 106 and a memory portion 108. A plurality of electrical contacts 110 can be provided for communication purposes. In addition to or instead of card 102, system 100 can also be designed to work with a contactless device such as card 112. Card 112 can include an IC chip 114 having a processor portion 116 and a memory portion 118. An antenna 120 can be provided for contactless communication, such as, for example, using radio frequency (RF) electromagnetic waves. An oscillator or oscillators, and/or additional appropriate circuitry for one or more of modulation, demodulation, downconversion, and the like can be provided. Note that cards 102, 112 are exemplary of a variety of devices that can be employed. The system 100 typically functions with other types of devices in lieu of or in addition to "smart" or "chip" cards 102, 112; for example, a conventional card 150 having a magnetic stripe 152. Furthermore, an appropriately configured mobile device (e.g., "smart" cellular telephone handset, tablet, personal digital assistant (PDA), and the like) can be used to carry out contactless payments in some instances; for example, via near field communications (NFC), wherein the appropriately configured mobile device acts like a contactless card 112 (or, with an electronic wallet present, like multiple such cards).

The ICs 104, 114 can contain processing units 106, 116 and memory units 108, 118. Preferably, the ICs 104, 114 can also include one or more of control logic, a timer, and input/output ports. Such elements are well known in the IC art and are not separately illustrated. One or both of the ICs 104, 114 can also include a co-processor, again, well-known and not separately illustrated. The control logic can provide, in conjunction with processing units 106, 116, the control necessary to handle communications between memory unit 108, 118 and the input/output ports. The timer can provide a timing reference signal from processing units 106, 116 and the control logic. The co-processor could provide the ability to perform complex computations in real time, such as those required by cryptographic algorithms.

The memory portions or units 108, 118 may include different types of memory, such as volatile and non-volatile memory and read-only and programmable memory. The memory units can store transaction card data such as, e.g., a user's primary account number ("PAN") and/or personal identification number ("PIN"). The memory portions of units 108, 118 can store the operating system of the cards 102, 112. The operating system loads and executes applications and provides file management or other basic card services to the applications. One operating system that can be used to implement some aspects or embodiments of the present invention is the MULTOS® operating system licensed by MAOSCO Limited. (MAOSCO Limited, St. Andrews House, The Links, Kelvin Close, Birchwood, Warrington, WA3 7PB, United Kingdom) Alternatively, JAVA CARD™-based operating systems, based on JAVA CARD™ technology (licensed by Sun Microsystems, Inc., 4150 Network Circle, Santa Clara, Calif. 95054 USA), or proprietary operating systems available from a number of vendors, could be employed. Preferably, the operating system is stored in read-only memory ("ROM") within memory portion 108, 118. In an alternate embodiment, flash memory or other non-volatile and/or volatile types of memory may also be used in the memory units 108, 118.

In addition to the basic services provided by the operating system, memory portions 108, 118 may also include one or more applications. At present, one possible specification to which such applications may conform is the EMV interoperable payments specification set forth by EMVCo, LLC (901 Metro Center Boulevard, Mailstop M3-3D, Foster City, Calif., 94404, USA). It will be appreciated that applications can be configured in a variety of different ways.

The skilled artisan will also be familiar with the MasterCard® Contactless specifications (the skilled artisan will appreciate that MASTERCARD CONTACTLESS was formerly known as MASTERCARD PAYPASS), available under license from MasterCard International Incorporated of Purchase, N.Y., USA (marks of MasterCard International Incorporated of Purchase, N.Y., USA).

As noted, cards 102, 112 are examples of a variety of payment devices that can be employed. The primary function of the payment devices may not be payment, for example, they may be cellular phone handsets that implement appropriate techniques. Such devices could include cards having a conventional form factor, smaller or larger cards, cards of different shape, key fobs, personal digital assistants (PDAs), appropriately configured cell phone handsets, or indeed any device with the appropriate capabilities. In some cases, the cards, or other payment devices, can include body portions (e.g., laminated plastic layers of a payment card, case or cabinet of a PDA, chip packaging, and the like), memories 108, 118 associated with the body portions, and processors 106, 116 associated with the body portions and coupled to the memories. The memories 108, 118 can contain appropriate applications. The processors 106, 116 can be operative to execute one or more steps. The applications can be, for example, application identifiers (AIDs) linked to software code in the form of firmware plus data in a card memory such as an electrically erasable programmable read-only memory (EEPROM).

A number of different types of terminals can be employed with system 100. Such terminals can include a contact terminal 122 configured to interface with contact-type device 102, a wireless terminal 124 configured to interface with wireless device 112, a magnetic stripe terminal 125 configured to interface with a magnetic stripe device 150, or a combined terminal 126. Combined terminal 126 is designed to interface with any combination of devices 102, 112, 150. Some terminals can be contact terminals with plug-in contactless readers. Combined terminal 126 can include a memory 128, a processor portion 130, a reader module 132, and optionally an item interface module such as a bar code scanner 134 and/or a radio frequency identification (RFID) tag reader 136. Items 128, 132, 134, 136 can be coupled to the processor 130. Note that the principles of construction of terminal 126 are applicable to other types of terminals and are described in detail for illustrative purposes. Reader module 132 can, in general, be configured for contact communication with card or device 102, contactless communication with card or device 112, reading of magnetic stripe 152, or a combination of any two or more of the foregoing (different types of readers can be provided to interact with different types of cards e.g., contacted, magnetic stripe, or contactless). Terminals 122, 124, 125, 126 can be connected to one or more processing centers 140, 142, 144 via a computer network 138. Network 138 could include, for example, the Internet, or a proprietary network (e.g., a virtual private network (VPN) such as is described with respect to FIG. 2 below). More than one network could be employed to connect different elements of the system. For example, a local area network (LAN) could connect a terminal to a local server or other computer at a retail establishment or the like. A payment network could connect acquirers and issuers. Further details regarding one specific form of payment network will be provided below. Processing centers 140, 142, 144 can include, for example, a host computer of an issuer of a payment device.

Many different retail or other establishments, represented by points-of-sale 146, 148, can be connected to network 138. Different types of portable payment devices, terminals, or other elements or components can combine or "mix and match" one or more features depicted on the exemplary devices in FIG. 1.

Portable payment devices can facilitate transactions by a user with a terminal, such as 122, 124, 125, 126, of a system such as system 100. Such a device can include a processor, for example, the processing units 106, 116 discussed above. The device can also include a memory, such as memory portions 108, 118 discussed above, that is coupled to the processor. Further, the device can include a communications module that is coupled to the processor and configured to interface with a terminal such as one of the terminals 122, 124, 125, 126. The communications module can include, for example, the contacts 110 or antennas 120 together with appropriate circuitry (such as the aforementioned oscillator or oscillators and related circuitry) that permits interfacing with the terminals via contact or wireless communication. The processor of the apparatus can be operable to perform one or more steps of methods and techniques. The processor can perform such operations via hardware techniques, and/or under the influence of program instructions, such as an application, stored in one of the memory units.

The portable device can include a body portion. For example, this could be a laminated plastic body (as discussed above) in the case of "smart" or "chip" cards 102, 112, or the handset chassis and body in the case of a cellular telephone, tablet, or the like.

It will be appreciated that the terminals 122, 124, 125, 126 are examples of terminal apparatuses for interacting with a payment device of a holder. The apparatus can include a processor such as processor 130, a memory such as memory 128 that is coupled to the processor, and a communications module such as 132 that is coupled to the processor and configured to interface with the portable apparatuses 102, 112, 150. The processor 130 can be operable to communicate with portable payment devices of a user via the communications module 132. The terminal apparatuses can function via hardware techniques in processor 130, or by program instructions stored in memory 128. Such logic could optionally be provided from a central location such as processing center 140 over network 138. The aforementioned bar code scanner 134 and/or RFID tag reader 136 can optionally be provided, and can be coupled to the processor, to gather attribute data, such as a product identification, from a UPC code or RFID tag on a product to be purchased.

The above-described devices 102, 112 can be ISO 7816-compliant contact cards or devices or NFC (Near Field Communications) or ISO 14443-compliant proximity cards or devices. In operation, card 112 can be touched or tapped on the terminal 124 or 128 (or an associated reader), which then contactlessly transmits the electronic data to the proximity IC chip in the card 112 or other wireless device.

One or more of the processing centers 140, 142, 144 can include a database such as a data warehouse 154.

For completeness, it should be noted that the system depicted in FIG. 1 may involve not only conventional transactions at "brick and mortar" merchants, but also, card-not-present transactions, such as card-not-present Internet transactions or card-not-present recurring payments. In some instances, an Internet Protocol (IP) address may be captured during card-not-present Internet transactions. In exemplary card-not-present Internet transactions, an individual utilizes his or her home computer to communicate with a server of an e-commerce merchant over the Internet. The individual provides his or her PAN to the merchant's server. The merchant utilizes the PAN to initiate an authorization request, and upon receiving an authorization request response indicating approval, will complete the e-commerce transaction. In exemplary card-not-present recurring payments, an individual provides his or her PAN and related data to a merchant (e.g., via phone or postal mail). The merchant utilizes the PAN to initiate an authorization request, and upon receiving an authorization request response indicating approval, will complete the recurring transaction.

In some cases, there can be payment card accounts which do not have physical cards or other physical payment devices associated therewith; for example, a customer can be provided with a PAN, expiration date, and security code but no physical payment device, and use same, for example, for card-not-present telephone or internet transactions. In this regard, a "cardholder" should be understood to refer to the account holder of a payment card account, regardless of whether the holder actually has a physical payment card or other physical payment device.

Figure 2:
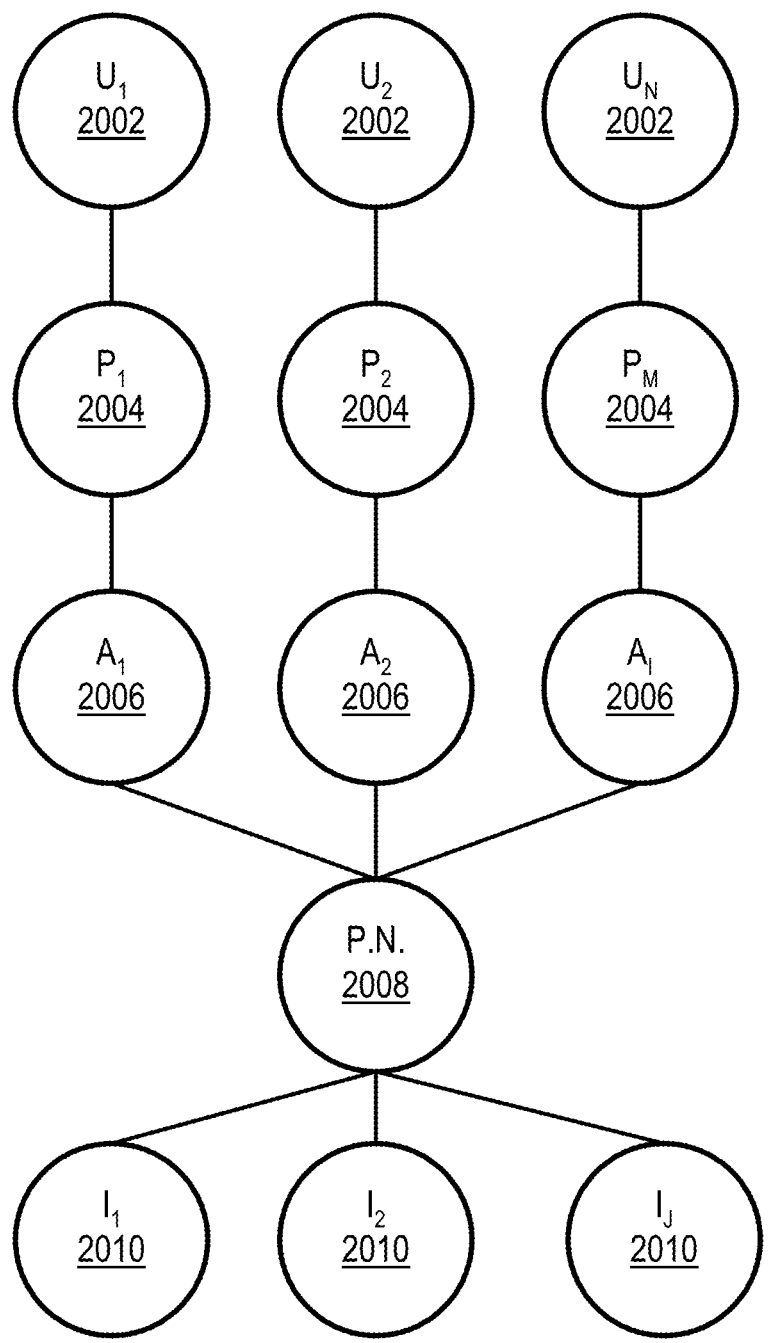
FIG. 2 depicts an exemplary inter-relationship between and among: (i) a payment network configured to facilitate transactions between multiple issuers and multiple acquirers, (ii) a plurality of users, (iii) a plurality of merchants, (iv) a plurality of acquirers, and (v) a plurality of issuers, useful in connection with one or more embodiments of the invention.

With reference to FIG. 2, an exemplary relationship among multiple entities is depicted. A number of different users (e.g., consumers) 2002, $U_1, U_2 \ldots U_N$, interact with a number of different merchants 2004, $P_1, P_2 \ldots P_M$. Merchants 2004 interact with a number of different acquirers 2006, $A_1, A_2 \ldots A_I$. Acquirers 2006 interact with a number of different issuers 2010, $I_1, I_2 \ldots I_J$, through, for example, a single operator 2008 of a payment network configured to facilitate transactions between multiple issuers and multiple acquirers; for example, MasterCard International Incorporated, operator of the BANKNET® network, or Visa International Service Association, operator of the VISANET® network. In general, N, M, I, and J are integers that can be equal or not equal. Note also that elements 2006, 2010 represent the entities that actually carry out processing for the acquirers and issuers respectively; in some instances, these entities carry out their own processing; in other entities, they utilize acquirer processors and issuer processors, respectively.

During a conventional credit authorization process, the cardholder 2002 pays for the purchase and the merchant 2004 submits the transaction to the acquirer (acquiring bank) 2006. The acquirer verifies the card number, the transaction type and the amount with the issuer 2010 and reserves that amount of the cardholder's credit limit for the merchant. At this point, the authorization request and response have been exchanged, typically in real time. Authorized transactions are stored in "batches," which are sent to the acquirer 2006. During subsequent clearing and settlement, the acquirer sends the batch transactions through the credit card association, which debits the issuers 2010 for payment and credits the acquirer 2006. Once the acquirer 2006 has been paid, the acquirer 2006 pays the merchant 2004.

It will be appreciated that the network 2008 shown in FIG. 2 is an example of a payment network configured to facilitate transactions between multiple issuers and multiple acquirers, which may be thought of as an "open" system. Some embodiments of the invention may be employed in relation to payment card accounts using other kinds of payment networks, for example, proprietary or closed payments networks with only a single issuer and acquirer. Furthermore in this regard, FIG. 2 depicts a four party model, as will be known to the skilled artisan; the four parties are the consumer 2002, merchant 2004, acquirer 2006, and issuer 2010. However, at least some embodiments are also of use with three-party models, wherein the acquirer and issuer are the same entity.

Messages within a network such as network 138 and/or network 2008, may, in at least some instances, conform to the International Organization for Standardization (ISO) Standard 8583, Financial *transaction card originated messages—Interchange message specifications*, which is the ISO standard for systems that exchange electronic transactions made by cardholders using payment cards. It should be noted that the skilled artisan will be familiar with the ISO 8583 standards. Nevertheless, out of an abundance of caution, the following documents are expressly incorporated herein by reference in their entirety for all purposes (published by ISO, Geneva, Switzerland, and available on the ISO web site):

ISO 8583 Part 1: Messages, data elements and code values (2003)
ISO 8583 Part 2: Application and registration procedures for Institution Identification Codes (IIC) (1998)
ISO 8583 Part 3: Maintenance procedures for messages, data elements and code values (2003)
ISO 8583:1993 (1993)
ISO 8583:1987 (1987)

As used herein, a "payment card network" is a communications network that uses payment card account numbers, such as primary account numbers (PANs), to authorize, and to facilitate clearing and settlement of, payment card transactions for credit, debit, stored value and/or prepaid card accounts. The card accounts have standardized payment card account numbers associated with them, which allow for efficient routing and clearing of transactions; for example, ISO standard account numbers such as ISO/IEC 7812-compliant account numbers. The card accounts and/or account numbers may or may not have physical cards or other physical payment devices associated with them. For example, in some instances, organizations have purchasing or procurement card accounts to which a payment card account number is assigned, used for making purchases for the organization, but there is no corresponding physical card. In other instances, "virtual" account numbers are employed; this is also known as PAN mapping. The PAN mapping process involves taking the original Primary Account Number (PAN) (which may or may not be associated with a physical card) and issuing a pseudo-PAN (or virtual card number) in its place. Commercially available PAN-mapping solutions include those available from Orbiscom Ltd., Block 1, Blackrock Business Park, Carysfort Avenue, Blackrock, Colo. Dublin, Ireland (now part of MasterCard International Incorporated of Purchase, N.Y., USA); by way of example and not limitation, techniques of U.S. Pat. Nos. 6,636,833 and 7,136,835 of Flitcroft et al., the complete disclosures of both of which are expressly incorporated herein by reference in their entireties for all purposes.

Some payment card networks connect multiple issuers with multiple acquirers; others use a three party model. Some payment card networks use ISO 8583 messaging. Non-limiting examples of payment card networks that connect multiple issuers with multiple acquirers are the BANK-NET® network and the VISANET® network. One or more embodiments are applicable to many other different kinds of payment card networks as well; the AMERICAN EXPRESS® network and the DISCOVER® network are non-limiting examples.

Figure 6:
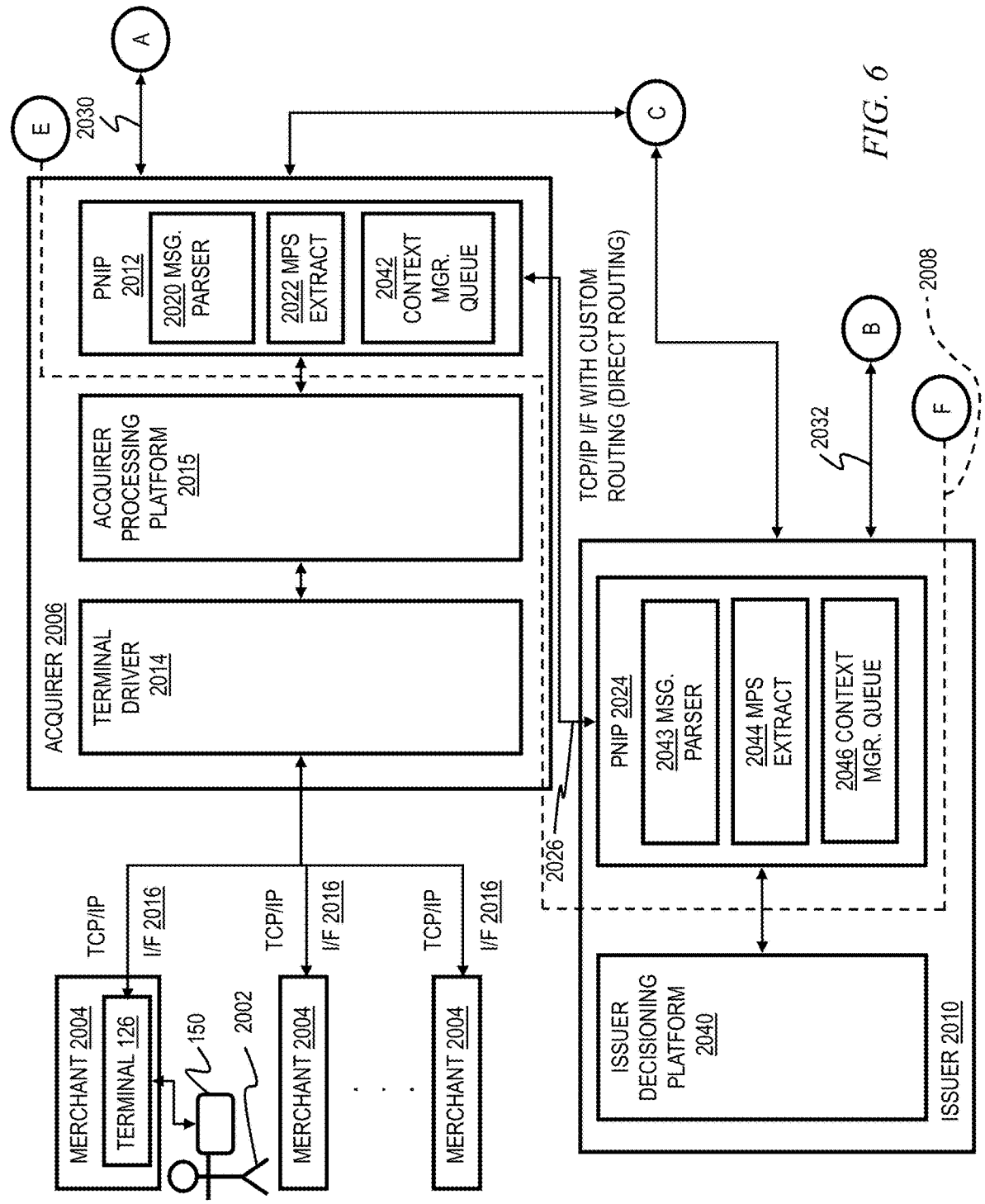
FIGS. 6 and 7 provide an exemplary detailed view of operation of a payment card network, in accordance with an aspect of the disclosure.
Figure 7:
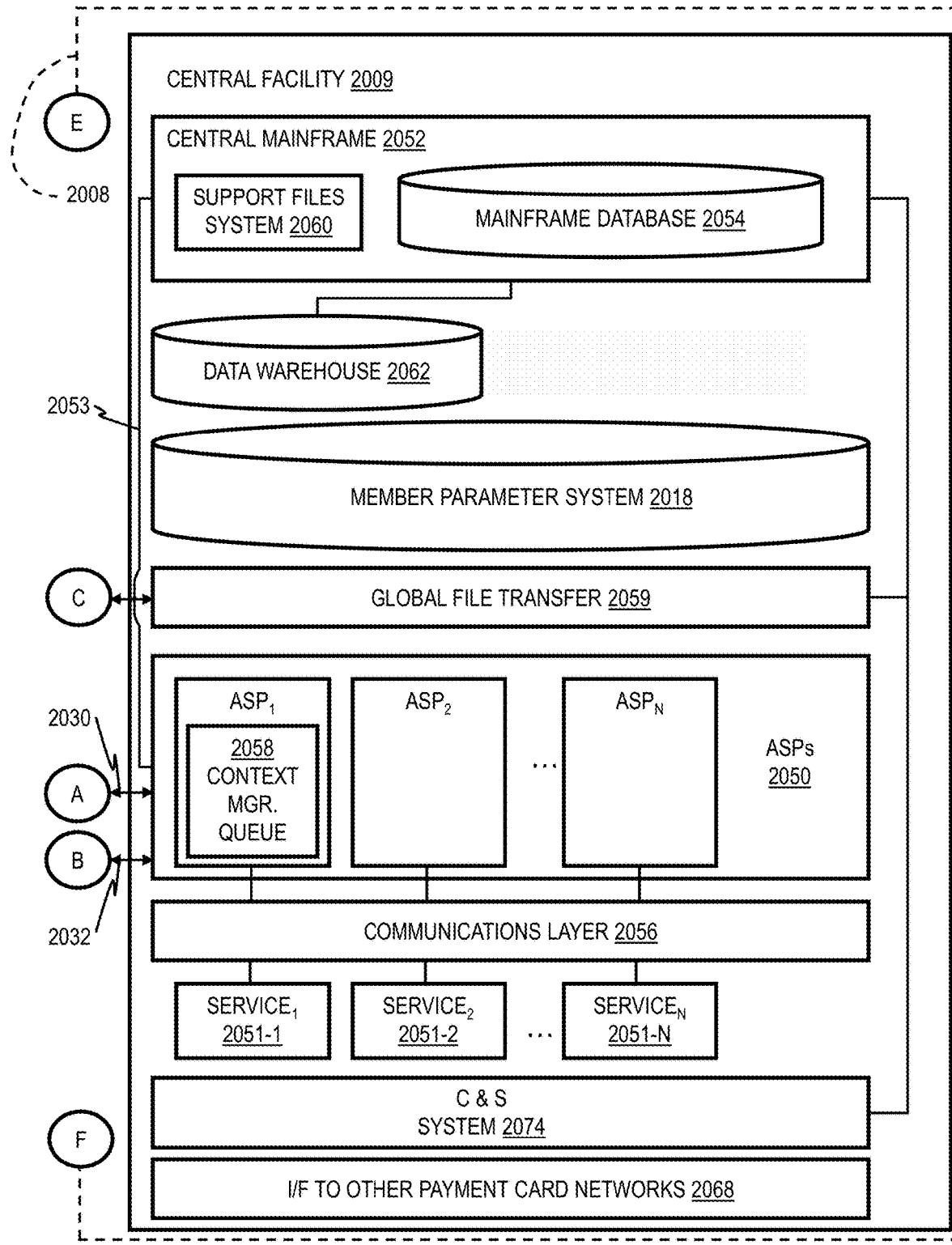

Still referring to FIG. 2, and with reference also now to FIGS. 6 and 7, by way of review and provision of additional detail, a consumer 2002 effectively presents his or her card 150 or other payment device (e.g., presents suitably configured "smart" phone or uses an e-wallet) to the terminal 126 of a merchant 2004. A mag stripe card 150 and combined terminal 126 are shown by way of example, but are intended to generally represent any kind of payment device and any kind of terminal. The effective presentation can happen directly (user enters a brick and mortar location of a merchant 2004) or virtually (user logs on to a web site of a merchant 2004 via a browser of a personal computer or the like, or calls on the telephone, and provides card information, or sends a "snail" mail with payment card account information to a merchant. The merchant terminal 126 captures the card account information (by swiping or wireless communication if directly presented; by manual keying or reading data if remote) and forwards same to the acquirer 2006. Interaction between the merchant and cardholder is outside the purview of the payment card network per se. The payment card network becomes involved at the connection between the acquirer 2006 and network 2008; the dotted line between points E and F in FIGS. 6 and 7 encompasses the network 2008. Note generally that points A, B, C, E, and F in FIG. 6 connect to the corresponding points in FIG. 7; the entire network and associated environment are not amenable to illustration on a single sheet.

More specifically, the acquirer 2006, in the more specific example of FIGS. 6 and 7, has at its premises a payment network interface processor (PNIP 2012). The MasterCard Interface Processor or MIP is a non-limiting example of a PNIP. In a non-limiting example, the PNIP is implemented on a rack-mounted server. PNIPs are typically located at the edges of the payment card network. In at least some instances, the payment card network of FIG. 2 is a distributed network wherein each acquirer and issuer has at least one PNIP on their premises. Each acquirer 2006 will have a relationship with one or more merchants 2004 and will interface with the merchants' terminals 126 via terminal driver 2014 (an acquirer may also act as an acquirer for themselves as a merchant). Furthermore in this regard, the merchant locations will have terminals where the cards are swiped (or where contacted or contactless devices are presented). The acquirer will employ terminal driver 2014 to interface with those terminals. Terminal driver 2014 is a logical block representing software and/or hardware that allows the acquirer processing platform 2015 to communicate with the terminals of the merchants via TCP, dial up, or the like (TCP/IP interfaces 2016 are shown in the example in the figures). Each merchant will decide what acquirer to use to accept one or more brands of payment cards, and the acquirer will set the merchant up with the appropriate software and/or firmware for the merchant's point of sale devices.

The acquirer 2006 will present transactions from many different merchants 2004 to the payment card network operator 2008 via the PNIP interface 2012. The connection between the merchants 2004 and the acquirer 2006 is typically a TCP/IP interface 2016. The format that the transaction is in when the card is swiped at the merchant 2004 may differ from the format that the transaction is in when actually received by the payment card network operator. The acquirer may convert the transaction into the ISO 8583 format or into a format that is a specific implementation of the ISO 8583 format (e.g., the MASTERCARD CIS (customer interface specification) format). The authorization request message can be an ISO 8583 message type identifier (MTI) 0100 message, for example, sent over the communications interface 2016 between the merchant 2004 and the acquirer 2006.

Once the 0100 message is received at the PNIP 2012 of the acquirer 2006, a series of edits can be performed on the transaction with respect to format, content, and/or context. Furthermore, screening can be carried out to determine whether the message relates to something beyond an ordinary authorization request, referred to as an enhanced service. Enhanced services may be screened for on behalf of one or more issuers 2010 and/or the operator of network 2008 itself. A centralized member parameter system (MPS) 2018 can be provided to house parameters used to drive processing of credit authorization transactions. In one or more embodiments, extracts from the centralized member parameter system 2018 are distributed to all acquirer PNIPs 2012 and issuer PNIPs 2024 on the network 2008 on a daily basis to drive processing of credit card transactions.

It should be noted at this point that an "ICA" and a "BIN" are employed in BANKNET so that a member can perform card issuing and/or acquiring activities. An ICA or Interbank Card Association is a four to six digit identification assigned by MasterCard for use by a member to uniquely identify activity the member is responsible for. A BIN or Bank Identification Number is a unique series of numbers assigned by MasterCard to a principal member and used as the first six digits of a cardholder account number. Other payment card networks have similar types of numbers, as will be apparent to the skilled artisan.

In at least some embodiments, the same member parameter extract is sent to all PNIPs and transactions are routed using same. In at least some circumstances, account numbers or ranges of account numbers are used in deciding how to route. In some cases, transactions are routed to an issuer PNIP based on where the account range is "signed in." Issuers send an MTI 0800 sign in request message with either a group ID or account range. The Member ID is pulled from the PNIP port 2038 (discussed elsewhere herein) configuration and transactions from that account range are then routed to the port from which the sign-in request is received. A member ID can be present on ports on multiple PNIPs at an Issuer site—see discussion of FIG. 9 below.

In one or more embodiments, based on the account range, the parameters in MPS 2018 (or a local extract thereof) will determine how to process a given transaction; e.g., product code, country code, currency code, and the like, including what enhanced services (if any) the issuer has signed up for on a particular account range. That is to say, the messages are parsed and certain fields, including the account range, are examined; the account range is associated with a certain issuer and based on that, the message may be treated differently. Messages may be parsed, and converted into an internal data format so that access can be obtained to all the individual data elements. In one or more embodiments, the account number is used as a key to access the MPS 2018 (or a local extract thereof) and retrieve all the parameters that are appropriate for processing the given transaction. In a non-limiting example, a suitable message parser 2020 (and other programs on the PNIP 2012) can be written in an appropriate high-level language or the like.

In an exemplary embodiment, the central MPS 2018 creates extracts once a day that are distributed out to the endpoints on the network (e.g., PNIPs 2012), as seen at 2022. These extracts include the pertinent information needed for the PNIP to process the message and determine if it requires any special handling. In some instances, messages are next routed to a central site 2009 for performance of enhanced services. On the other hand, if no special services are required, the message may be routed directly to the issuer PNIP 2024 as seen at 2026.

Messages routed directly to the issuer PNIP: In this aspect, the transaction is routed directly to the issuer PNIP 2024 based on the MPS extract 2022, as seen at 2026. Every account range will have a unique destination endpoint identified in the parameters (account ranges may be grouped and all members of the account range group may have a common destination endpoint). The member interface refers to the connection between the acquirer processor 2006 and the Acquirer PNIP 2012. This term also applies to the interface between the Issuer PNIP 2024 and issuer processor 2010. The connections between and among acquirer PNIP 2012 and issuer PNIP 2024, acquirer PNIP 2012 and ASPs 2050 (discussed elsewhere herein), and ASPs 2050 and issuer PNIP 2024 are referred to as a network interface onto the payment card network itself. In one or more embodiments, this may be a TCP/IP connection (as seen at 2026) with customized routing capabilities including group addresses. Normally, TCP/IP addresses refer to a single endpoint. Group addresses may be directed to a group of addresses, and will target any of the computers (e.g., PNIPs) in the group using a variety of protocols. Some use a round robin approach; others may use a first in list approach where the message is always routed to one given computer first and then to a second computer only if the first is not available. Group addressing may be useful, for example, where an acquirer or issuer has multiple PNIPS at the same location for redundancy/fault tolerance. It is also possible to combine the approach and institute a round robin, wherein the addresses within the round robin are first in list group address, or conversely, it is possible to institute a first-in-list, wherein the addresses within the first-in-list are round robin group addresses. These capabilities are useful in case of outages, maintenance, and the like.

Figure 8:
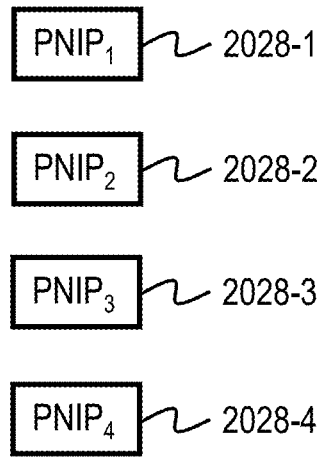
FIG. 8 shows a group of payment network interface processors, such as may be used with the network of FIGS. 6 and 7.
Figure 9:
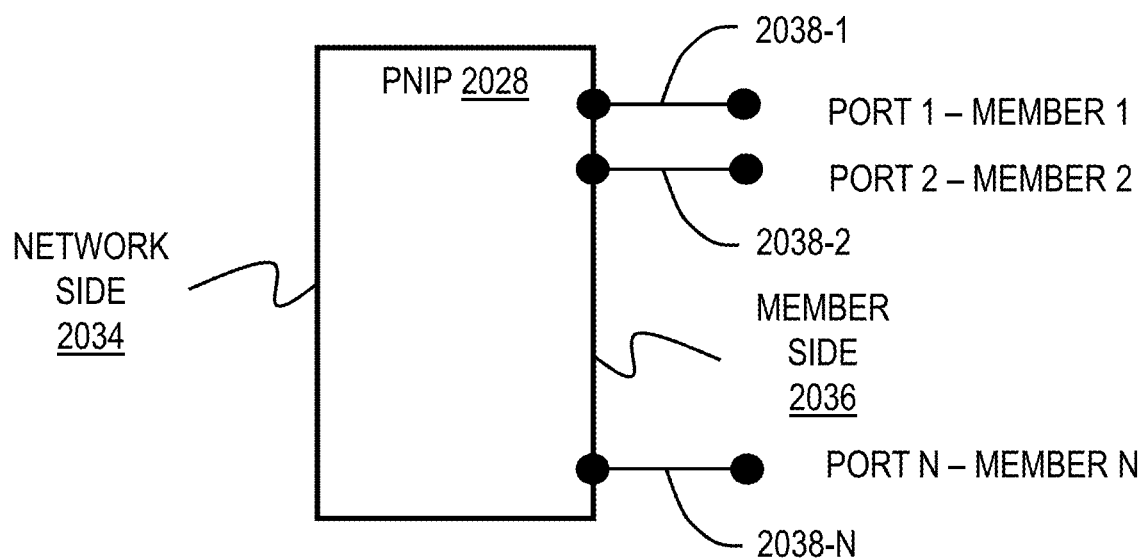
FIG. 9 shows a port arrangement on a payment network interface processor, such as may be used with the network of FIGS. 6 and 7.

FIG. 8 shows a non-limiting example with four PNIPs 2028-1 through 2028-4. In a round robin approach, a first message is routed first to PNIP 2028-1, a second message to PNIP 2028-2, a third message to PNIP 2028-3, a fourth message to PNIP 2028-4, a fifth message to PNIP 2028-1, and so on. In a first in list approach, all messages are routed to PNIP 2028-1; if it is not available for a given message, the message is routed to PNIP 2028-2; if PNIP 2028-2 is not available, the message is routed to PNIP 2028-3; if PNIP 2028-3 is not available, the message is routed to 2028-4. Each PNIP 2028-1 through 2028-4 in FIG. 8 could be a single machine or a group of machines addressed by first in list or round robin as discussed just above. In one or more embodiments, the physical network 2026 between PNIPs 2012, 2024 and the physical network 2030, 2032 between PNIPs 2012, 2024 and the central site 2009 is a private Multiprotocol Label Switching (MPLS) TCP/IP network and is not the Internet. Once the issuer's network group address has been determined by the PNIP 2012 (or ASP 2050), the message is routed to the issuer PNIP 2024. Once the 0100 auth message arrives at the issuer PNIP 2024, additional edits are performed to double check and make sure that the message has been routed to the correct location. Furthermore, the member ID is examined, because some issuers may share a single PNIP and it is necessary to determine which of the issuers (members) sharing that PNIP the transaction in question is to be routed to. Each of the issuers sharing the PNIP will have its own port on the member side of the PNIP; the transaction is routed to the appropriate port based on the member parameters. See FIG. 9 where a generalized PNIP 2028 has a network side 2034 and a member side 2036. Member side 2036 has N ports 2038-1 through 2038-N to members 1 to N. N is used herein as a generalized arbitrary integer and the value of N in FIG. 9 is not necessarily the same as that of N in connection with elements 2002 in FIG. 2, for example.

Figure 10:
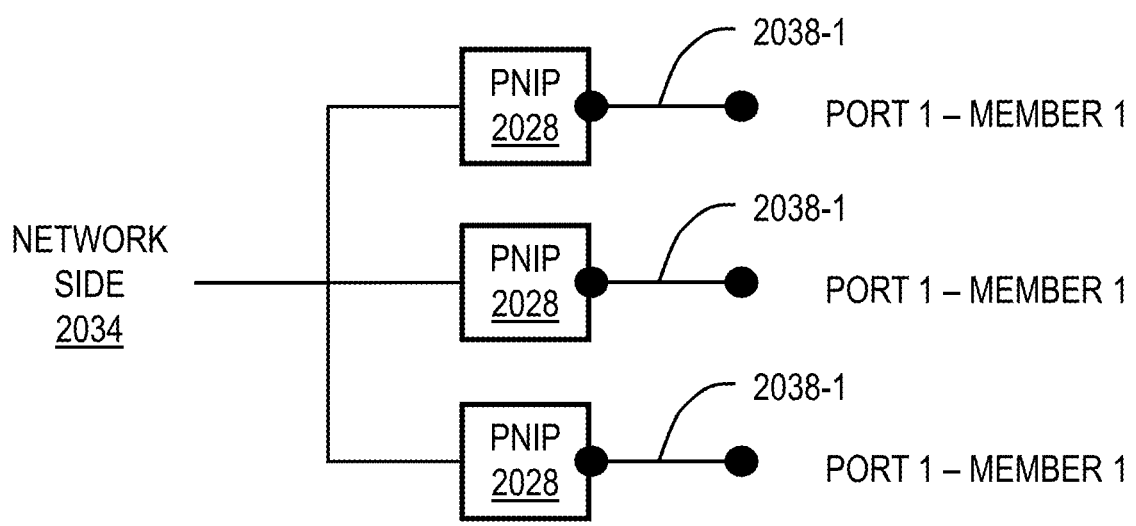
FIG. 10 shows a case wherein an issuer has multiple payment network interface processors.

As seen in FIG. 10, in some instances, an issuer has multiple PNIP devices 2028 at a single site, with a network-side connection 2034, and with multiple PNIPs 2028 all connected to the same host system (each has port 1 2038-1 associated with the same member (issuer)).

At this point, the 0100 message has been delivered to the issuer 2010. The issuer 2010 then carries out issuer processing and decisioning (e.g., with issuer processing platform 2040) based on transaction velocities, open to buy, fraud detection protocols, etc., and provides an appropriate authorization request response, ISO 8583 MTI 0110. There are a number of different possible response codes defined within ISO 8583 and its particular implementations. Each transaction is made up of multiple data elements; the response from the issuer is included in data element 39. Once the 0110 message is received on the issuer PNIP 2024 from platform 2040 it is parsed and edited for format, content, and context, including validation of DE39 to make sure that it is a valid value.

It is worth noting that in one or more instances, at every point where a transaction touches a computer of the payment card network, whether it be an acquirer PNIP 2012, issuer PNIP 2024, or a special services computer or computers 2050 at the central location 2009 (discussed below), transaction context is preserved. That is to say, before the message is sent on to the next node in the network, a copy is saved in a context manager queue 2042, 2046, 2058, so that when the transaction response MTI 0110 comes back through, the request MTI 0100 can be matched with the response, in order to know how to route the response back to the previous route point. One of the items saved in the context manager queue is the message originator's address, so that it can be used for route-back information. Once the issuer PNIP validation is complete, including format, content, and context edits, the transaction is extracted from the context manager queue 2046 and the route-back address is retrieved, and the 0110 message is then sent back where it came from; in this case, the acquirer PNIP 2012 (or ASP 2050). The acquirer PNIP 2012 then receives and parses the message and pulls its original request out of its context manager queue 2042. Note that multiple acquirers may share an acquirer PNIP and it is therefore necessary to know which port on the acquirer PNIP to route the response back to (see discussion of FIG. 9). Checking the message against the original request in the context manager queue allows the message to be routed back to the correct port.

Each PNIP 2012, 2024 typically has many different programs. These can include, for example, a parser/editor 2020, 2043; a parameter file manager; a transaction context manager; a member communications program; a network communications program; and the like. Please note that to reduce clutter, FIGS. 6 and 7 show "MPS extract" 2022, 2044; this will typically include the extract itself and the associated parameter file manager which manages obtaining the extracts from MPS 2018. Similarly, to reduce clutter, FIGS. 6 and 7 show "context manager queue" 2042, 2046; this will typically include the queue itself and the associated manager which manages the contents of the queue. In one or more embodiments, there is also a communication program used to communicate between the other programs (inter-process communications) on the PNIP; this is omitted from FIGS. 6 and 7 to avoid clutter.

Messages in case of Enhanced Services: In one or more instances, a special architecture is used to facilitate delivery of enhanced services (the ASP 2050 in FIGS. 6 and 7 is a non-limiting example). Examples of enhanced services include the MasterCard "inControl" product providing spending controls and/or virtual card numbers. Other examples are loyalty rewards, recurring payment cancellations, and the like. One or more instances do not deploy this complex logic out to the network edge. Furthermore in this regard, the issuer and acquirer PNIPs 2012, 2024 are referred to as being on the edge because they reside on the customer's premises 2006, 2010. There may be over 2000 PNIPs on a typical network. The special architecture used in one or more instances is a central site type architecture associated with location 2009. At the central site 2009, certain computers are referred to as authorization services processors or ASPs 2050.

On the acquirer PNIP 2012, when checking the member parameter file for an account range, determine whether the transaction requires enhanced services. If yes, the transactions is routed to the central site ASPs 2050, which have interfaces to all of the service provider systems—the ASPs do not necessarily provide the services themselves (although they can in some embodiments), but may mediate between the network (e.g., BANKNET) and the actual service providers 2051-1 through 2051-N. An ASP will typically have connections 2053 to a mainframe 2052 via DB2 connect or other suitable connection. If a transaction is to be enriched with additional data, a database call will be made to the mainframe 2052 to retrieve the information from mainframe database 2054 so that it can be inserted into the transaction before the transaction is forwarded to the issuers. Interfaces can also be provided to a risk management system, a decisioning management system, IN CONTROL, rewards, and the like. Service providers 2051-1 through 2051-N generally represent any enhanced services, non-limiting examples of which have been given herein.

A communications layer 2056 is used to communicate with the service providers in one or more embodiments, a non-limiting example of a suitable implementation is the IBM MQ series. The 0100 message may be sent to the service providers, optionally encapsulated inside a special "enhanced services" (ES) header that wraps the message with any additional information required to fulfill the service. The service provider sends a response. The ASP takes the response and enriches the 0100 transaction with the service response, and then sends the entire package on to the issuer PNIP 2024. Some enhanced services are processed on the request messages (0100) and others are processed on the response messages (0110). Once the response message is processed on the ASP, the original message will be pulled from the context manager queue 2058 on the ASP to determine the appropriate acquirer PNIP 2012 to route the message back to. From there, the acquirer PNIP will behave just as in the "Messages routed directly to the issuer PNIP" case discussed above. Some embodiments of the special architecture use an Enterprise Service Bus to mediate and facilitate some of the services 2051. For example, the In CONTROL service can be accessed via an instance of an Enterprise Service Bus.

Entry of Data into the Data Warehouse: In one or more instances, every transaction that flows through the issuer PNIP 2012, acquirer PNIP 2024, and/or ASPs 2050 is logged at every point by writing log records. Multiple times a day (e.g., six), a global file transfer system 2059 pulls the logs off each node and collects them into a support files system 2060 on the mainframe 2052. The log files are parsed and collected into a general daily file. The general daily file is scrubbed and modified to create a consolidated file on the mainframe which is then pulled into the data warehouse 2062, where additional data manipulation and scrubbing are performed before the transactions are stored. The data warehouse 2062 is located at an intermediate node (location 2009) connected to the PNIPs of the acquirers and issuers 2012, 2024. By way of clarification, in one or more embodiments, the node 2009 is directly connected to the PNIPs 2012, 2024 but the data warehouse is not directly connected to the 2012 and 2024 devices; rather, data flows through GFT and SF systems 2059, 2060 and ends up in the data warehouse. Data warehouse 2062 should be distinguished from a data warehouse 154 that might be maintained by an issuer.

Clearing and Settlement: One or more instances employ a clearing and settlement system 2074. In clearing, via global file transfer 2059, acquirers submit clearing files in an appropriate message format (in a non-limiting example, Integrated Product Messages (IPM) format). The files contain, from the acquirers' perspective, what they believe they should be paid for. In one or more instances, the authorization does not actually move any money; the authorization only validates that the cardholder is a valid cardholder recognized by the bank, which will honor payment to the merchant for the goods or services. For example, in a typical restaurant visit, the card is swiped for the receipt amount but then a tip is added. The clearing message will have the actual food amount plus the tip. In one or more instances, the clearing does not actually move the money; it merely resolves the actual amounts. The settlement system actually initiates movement of the money. Furthermore in this regard, the settlement system actually tells the banks how much money to move but does not actually move the money. Within clearing, processes include dispute resolution, chargeback, and the like. During clearing, files are sent from the acquirers to the payment card network; the payment card network, using clearing and settlement system 2074, then takes the files and splits them and sorts them by issuer. Response files are then received from each issuer, and these response files are again split and re-sorted back to the correct acquirers. Eventually, data flows into the settlement system and money is moved. Thus, at a high level, the auth request and auth request response are in real time, and the clearing and settlement are in a batch mode.

By way of review and provision of additional detail, in at least some instances, in a batch mode, clearing is initiated via an ISO 8583 MTI 1240 message having a DE24 function code value of 200 for a first presentment. Once this message is obtained from the acquirer, the payment card network, using clearing and settlement system 2074, will undertake syntax edits, format edits, content edits, and context edits (typically applied to every transaction). If those edits are passed, the interchange and fees associated with the transaction will be calculated. Based on the calculations, the message may also be enriched with additional information before being passed on to the issuer. The settlement amount is then determined. Within the clearing cycle, the amounts of money due to each given member (e.g., issuer or acquirer) are accumulated, and these are summed up into a settlement file which is forwarded in due course.

Cryptographic aspects: Consider the concepts of data at rest and data in motion. An example of data at rest is the log files that actually reside on the PNIPS themselves—configuration information containing card numbers or personally identifiable information (PII). In one or more embodiments, all sensitive data at rest is encrypted before being written to disk. Data in motion refers to data actually moving over a transmission medium (e.g., wires, coaxial cable, fiber optic cable, RF link). All PCI-sensitive data (PCI Security Standards Council, LLC, Wakefield, Mass. US) is encrypted, whether written to disk or being sent over a network. In at least some instances, internal links within the premises of the acquirers and issuers are not encrypted since it is assumed that the customer premises are a physically secure facility relying on physical security of the hardware. On the other hand, in at least some instances, external links (e.g., links 2026, 2030 and 2032) are all encrypted for both authorization traffic and bulk file transfers.

One or more embodiments will have interface(s) 2068 to other brands of payment card processing network. For example, a MASTERCARD branded payment card processing network may have interfaces to networks such as AMERICAN EXPRESS, VISA, JCB, DISCOVER, and the like. Suitable translation layers can be provided to intermediate between MASTERCARD (or other) format and formats used by other networks, as appropriate. In one or more embodiments, interfaces 2068 to other payment networks are provided via a machine, located at 2009, but generally analogous to an Issuer PNIP 2024 with added mediation layers loaded as required by other payment network formats. Some merchants may only have a single interface to, e.g., the MASTERCARD network—all transactions from that merchant may be routed to MASTERCARD, regardless of what card was used—MASTERCARD will process those transactions and route them out to the appropriate networks.

While payment card networks have generally been used as described with regard to FIGS. 1 and 2, recently, MasterCard MONEYSEND (mark of MasterCard International Incorporated, Purchase, N.Y., US) money transfer services have provided a new dimension. A funding transaction moves money from the sender (customer) to the Originating Institution (the financial institution providing the money transfer service); that transaction can be initiated through a MONEYSEND application program interface (API). The sender can fund the transaction using a MasterCard card account or other branded card account that the Originating Institution accepts; from a bank account; or with cash. A Payment Transaction transfers funds from the Originating Institution, via the MasterCard Network (e.g., BANKNET), to the payment card account identified by the recipient at the Receiving Institution. Funds can be transferred to a MasterCard® card, Debit MasterCard® card, and the like (marks of MasterCard International Incorporated, Purchase, N.Y., US). Such transactions are discussed further below and are an example of what are more generally referred to herein as special payment transactions.

Electronic Bill Presentment and/or Payment Systems

The process of electronic bill presentment and payment has also been popular for quite some time. For example, U.S. Pat. No. 5,699,528 to Hogan, expressly incorporated herein by reference in its entirety for all purposes, discloses a system and method for bill delivery and payment over a communications network. In the bill delivery and payment system, users are able to access a server computer on a communications network to obtain bill information and pay bills.

Figure 3:
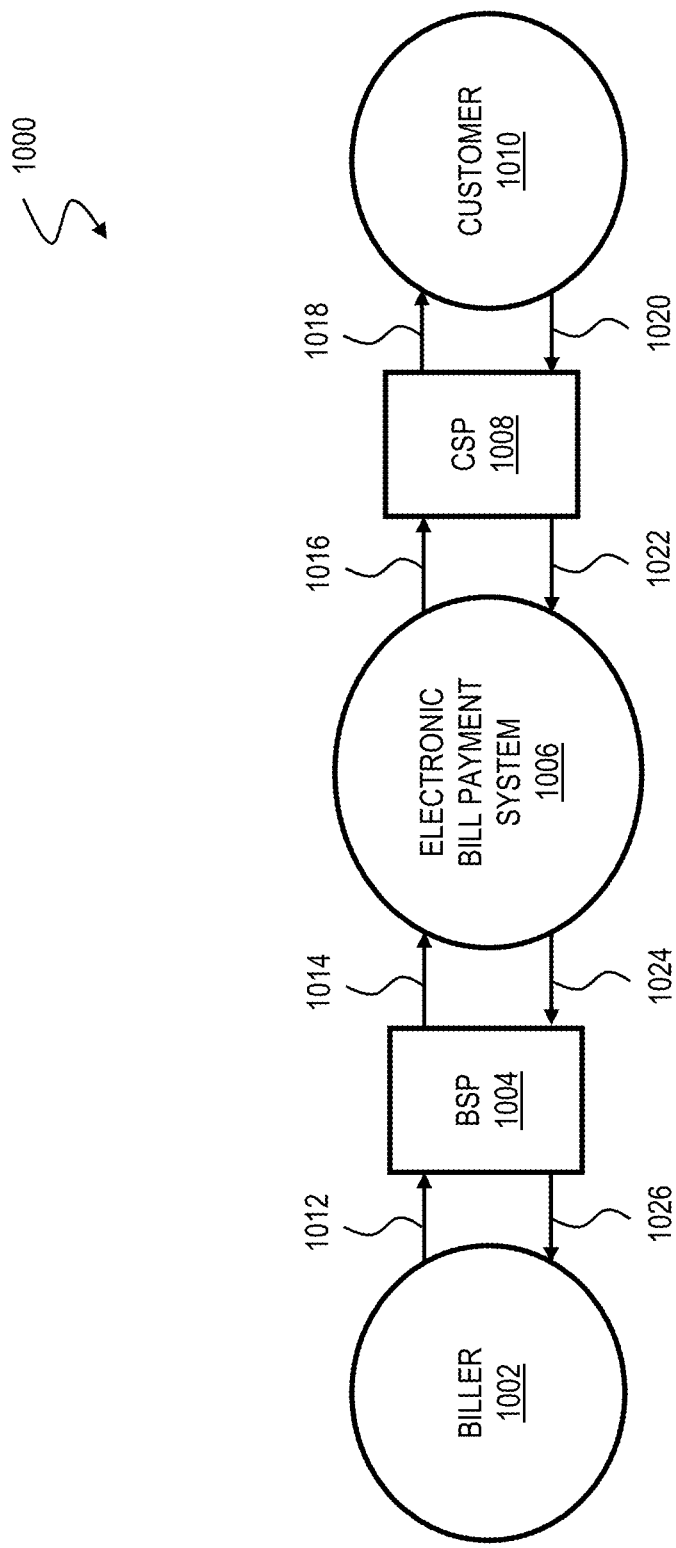
FIG. 3 shows exemplary operation of a bill pay system, as known from the prior art.
Figure 4:
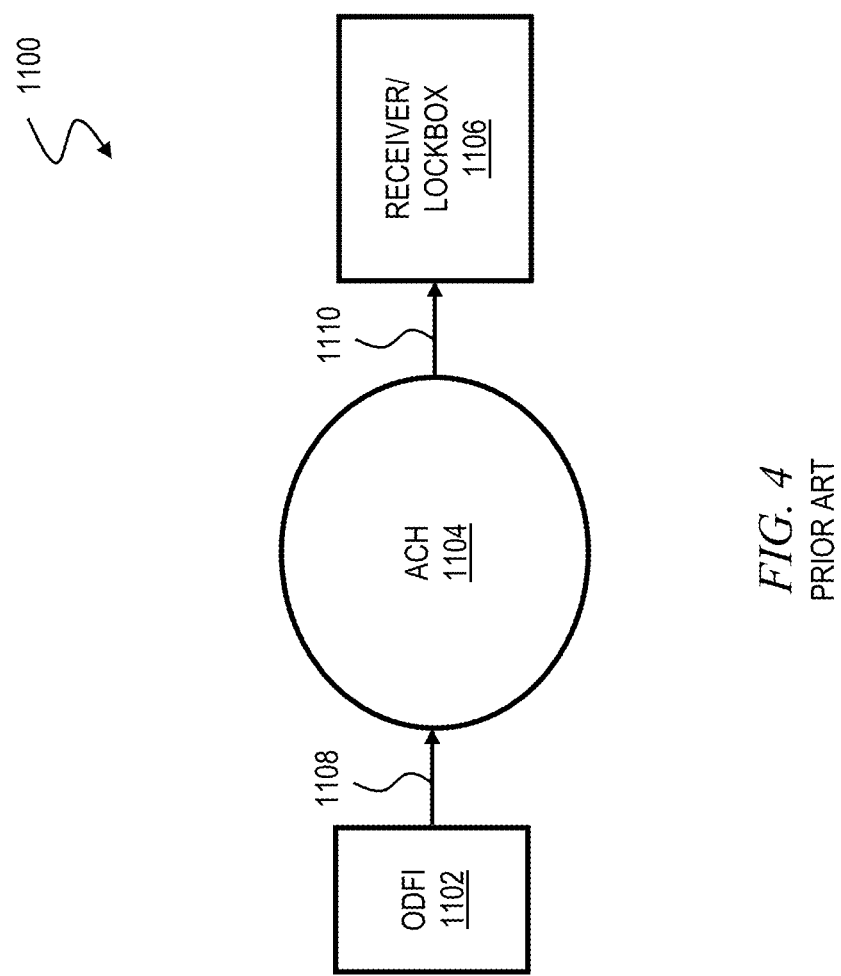
FIG. 4 shows exemplary operation of current automated clearinghouse payments.

Referring now to FIGS. 3 and 4, electronic bill payment systems are conceptually different than payment card networks, and will often use electronic funds transfer from a demand deposit account. In some instances, a single entity, such as MasterCard International Incorporated (a non-limiting example) will operate both a payment card network and an electronic bill payment system (optionally, with presentment functionality).

Electronic bill presentment and payment systems can be used in connection with some embodiments; one example is the MASTERCARD RPPS® electronic payment system of MasterCard International Incorporated of Purchase, N.Y., USA. This example is non-limiting; for example, other types of electronic bill presentment and/or payment systems could be employed in other instances. Non-limiting examples are described in:

US Patent Publication 2011-0251952 A1 of Mary L. Kelly et al., expressly incorporated herein by reference in its entirety for all purposes.

US Patent Publication 2012-0197788 A1 of Hemal Sanghvi et al., expressly incorporated herein by reference in its entirety for all purposes.

US Patent Publication 2013-0290177 A1 of Amy Christine Milam and Stephen Joseph Klaus, expressly incorporated herein by reference in its entirety for all purposes.

US Patent Publication 2013-0311362 A1 of Amy C. Milam et al., expressly incorporated herein by reference in its entirety for all purposes For the avoidance of doubt, references to "MasterCard," "an entity such as MasterCard International Incorporated," and the like, unless expressly stated to be limited to MasterCard, are intended to be exemplary of an operator of an electronic bill payment system (optionally, with presentment functionality), an operator of a payment card network, an operator of a remittance system, and/or an operator of a biometric authentication service, as will be appreciated by the skilled artisan from the context, whether or not qualified by words such as "or other operator."

Furthermore, another non-limiting example of an electronic bill presentment and/or payment system that could be used in connection with some embodiments of the invention is the CHECKFREE platform available from Fiserv, Inc. of Brookfield, Wis., USA. Other possibilities will also be apparent to the skilled artisan, given the teachings herein.

FIG. 3 shows operation of an electronic bill payment system, such as the MASTERCARD RPPS® electronic payment system, which is but one non-limiting example of such a system. As shown in FIG. 3, in an approach 1000, during a presentment phase, a biller 1002 electronically sends billing information 1012 to its biller service provider (BSP) 1004; that is, an institution that acts as an intermediary between the biller and the consumer for the exchange of electronic bill payment information. BSP 1004 in turn sends the information to the electronic bill payment system 1006, as seen at 1014. As seen at 1016, the system 1006 in turn delivers the billing information to the customer service provider (CSP) 1008, that is, an agent of the customer that provides an interface directly to customers, businesses, or others for bill payment and presentment. The CSP enrolls customers, enables payment and presentment, and provides customer care. CSP 1008 presents the bill to the consumer (customer) 1010 at 1018.

In a payment phase, consumer 1010 sends bill payment instructions to CSP 1008, as seen at 1020. CSP 1008 in turn sends the bill payment information to the system 1006, as at 1022. The system sends funds and data electronically to BSP 1004, as at 1024. The BSP 1004 posts payment information to the biller 1002, as at 1026.

Note that "BPPS" is used herein as shorthand for an electronic "bill presentment and payment system"; the MASTERCARD RPPS system is a non-limiting example of such a system.

Note that in some instances, billers 1002 can connect directly to BPPS 1006 without the use of BSP 1004. In such cases, billers 1002 exchange presentment and payment data directly with BPPS 1006.

FIG. 4 shows a current process 1100 for making electronic funds transfers (EFT) for bill payment or the like. An originating depository financial institution (ODFI) 1102, also known as an originator, sends instructions (e.g., payment data and remittance data) using a network such as the automated clearing house (ACH) 1104, Swift, EPN, CHIPS, Fedwire, and the like, as seen at 1108. As shown at 1110, the ACH or similar network 1104 relays the instructions to the receiving depository financial institution (RDFI) (e.g., receiver or a lockbox), designated 1106. In some embodiments, an ACH file format can be used; non-limiting examples of ACH file formats include the NACHA ACH CIE, NACHA ACH PPD, or NACHA ACH CCD (e.g. for corporate-to-corporate cases) file formats. Other formats can also be used; for example, extensible markup language (XML). It should be noted that a variety of networks can be used, both public (for example, ACH) and proprietary (for example, the aforementioned MASTERCARD RPPS system).

Figure 5:
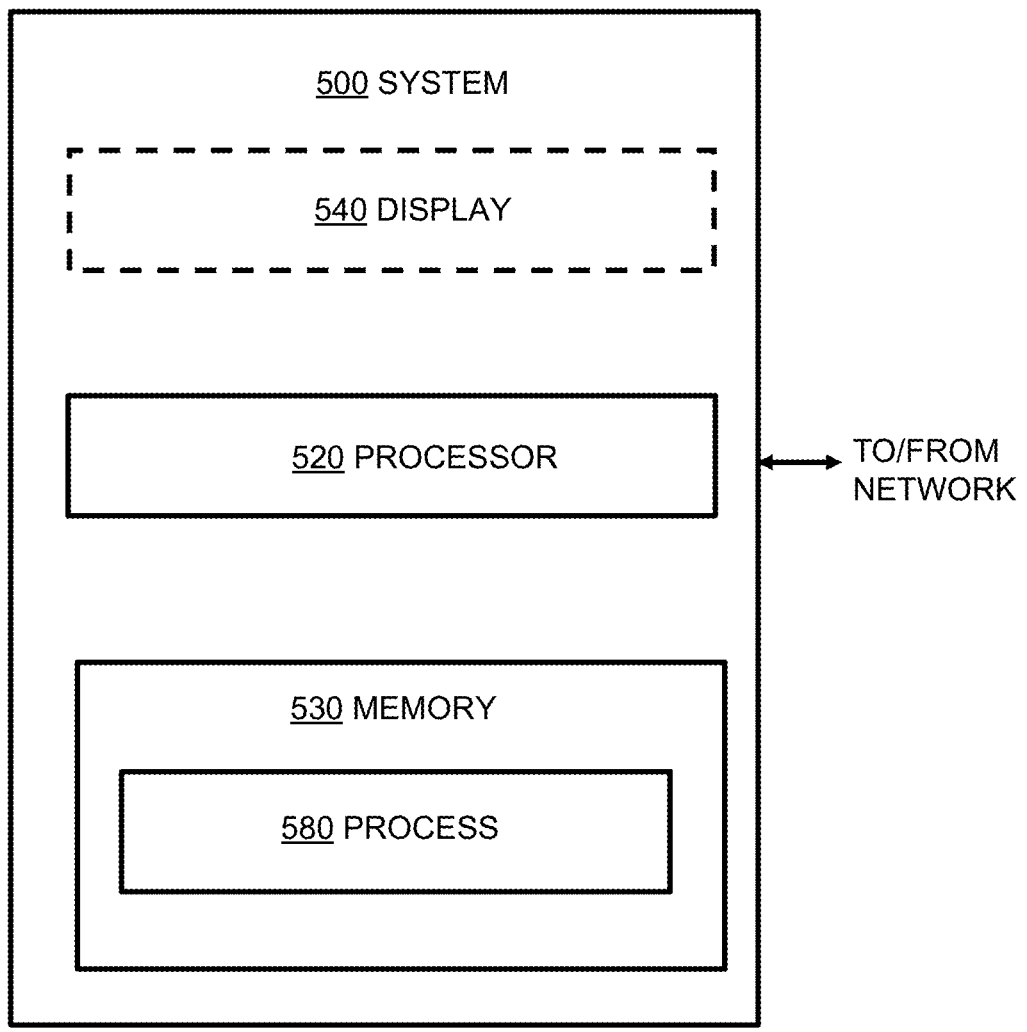
FIG. 5 is a block diagram of an exemplary computer system useful in one or more embodiments of the invention.

As used herein, an "electronic bill presentment system using customer service providers" refers to a system wherein electronic bills are distributed from billers, through an aggregator switch, out to financial institutions or other customer service providers such that those financial institutions or other customer service providers can display the electronic bills, through the financial institutions' or other customer service providers' own on-line banking interface, to bill-paying customers of the financial institutions or other customer service providers. FIG. 5 of the herein-referenced US Patent Publication 2011-0251952 A1 of Mary L. Kelly et al. shows an exemplary block diagram of an electronic bill presentment system, including a bill payment platform and a bill presentment platform; the bill payment platform may utilize techniques disclosed in the herein-referenced US Patent Publication 2012-0197788 A1 of Hemal Sanghvi et al.

Some electronic bill payment systems use the NACHA ACH Standard Entry Class (SEC) formats, such as CIE (Customer Initiated Entries), CTX (Corporate trade exchange); CCD (Cash Concentration or Disbursement); or PPD (Prearranged payment and deposits). Some electronic bill payment systems use a modified form of the NACHA CIE (MOD-CIE) wherein a payment system operator requires specific values for certain fields. Some electronic bill payment systems (e.g., MASTERCARD RPPS) provide translation capability and can receive input in many different formats, translate it for internal use, and translate it again for output in many different formats, which may be the same as or different from the input formats. Some electronic bill payment systems provide customer service providers with the capability to specify when the electronic bill payment system will look to them for payment instructions. Some electronic bill payment systems provide biller service providers with the capability to specify when the electronic bill payment system will initiate payments. FIG. 5 of the herein-referenced US Patent Publication 2012-0197788 A1 of Hemal Sanghvi et al. shows exemplary system interfaces of an electronic bill payment system.

As noted above, electronic bill presentment and payment systems are conceptually different than payment card networks, and will often use electronic funds transfer from a demand deposit account. Nevertheless, some electronic bill presentment and/or payment systems receive and send data over a network such as is shown in FIG. 2, using capability such as MasterCard Global File Transfer (GFT). Furthermore, US Patent Publication 2010-0100480 of Theresa Altman et al., hereby expressly incorporated by reference herein in its entirety for all purposes, describes a system wherein payment of a bill using a payment card account is facilitated by formatting and dispatching a message from a bill payment provider to an electronic bill payment system. The message is flagged with a flag indicating that the message includes a non-financial, card payment, message. The message includes an identification of the biller, a card number of the payment card account, and an expiration date of the payment card account. The message is an electronic funds transfer message augmented with the flag, the card number, and the expiration date.

Some electronic bill payment systems use technology such as described in the herein-referenced US Patent Publication 2013-0290177 A1 of Milam and Klaus to reduce the number of non-electronic payments. Some electronic bill payment systems use technology such as described in the herein-referenced US Patent Publication 2013-0311362 A1 of Amy C. Milam et al. to facilitate approximately matching entered payee information to stored biller information.

Exemplary Mobile Device

Figure 11:
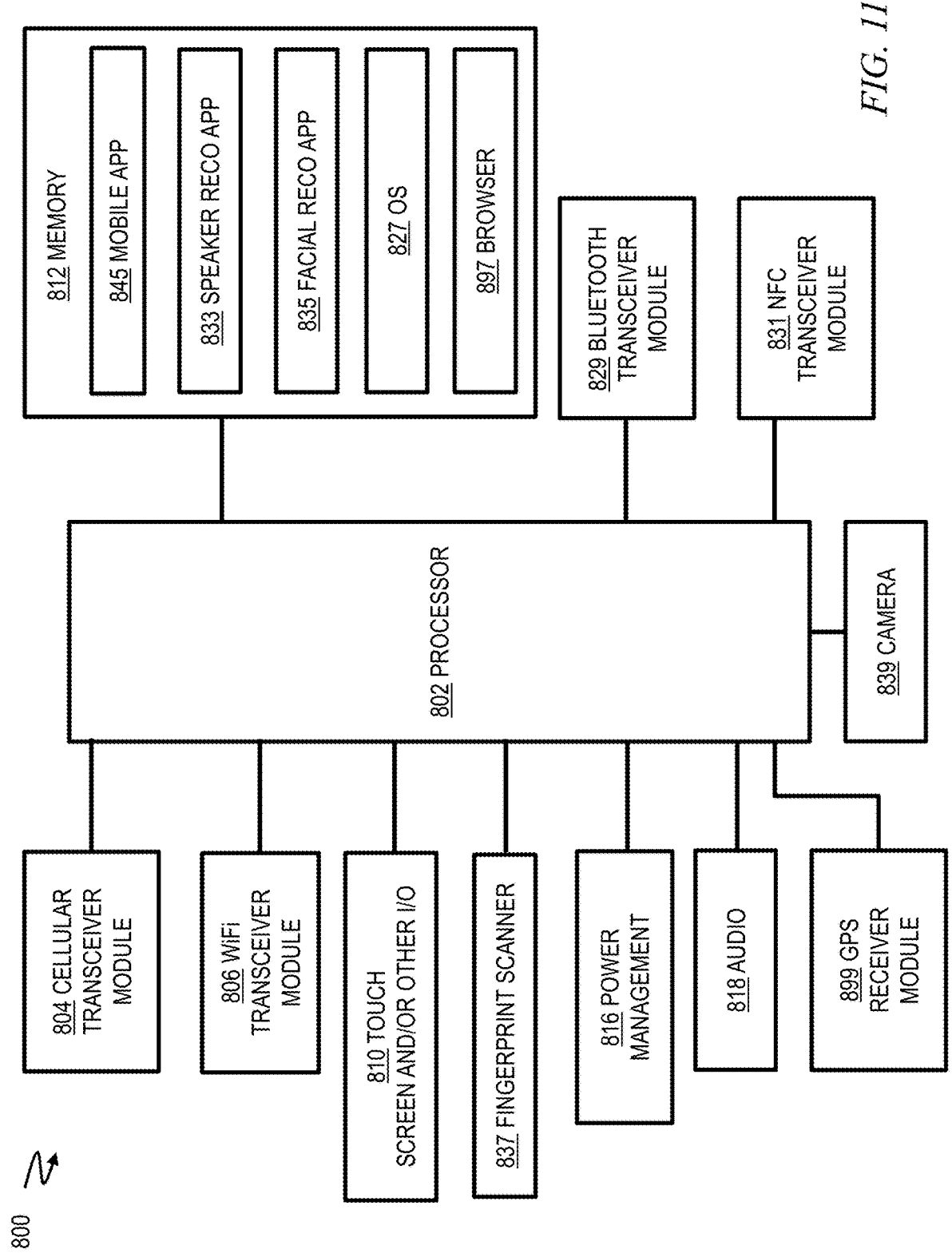
FIG. 11 is a block diagram of a "smart" phone or tablet computer useful in one or more embodiments of the invention.

FIG. 11 is a block diagram of an exemplary tablet computing device, netbook, "Ultrabook" or other subnotebook, laptop, mobile electronic device, or smart phone 800 or the like. Unit 800 includes a suitable processor; e.g., a microprocessor 802. A cellular transceiver module 804 coupled to processor 802 includes an antenna and appropriate circuitry to send and receive cellular telephone signals, e.g., 3G or 4G. In some cases, a Wi-Fi transceiver module 806 coupled to processor 802 includes an antenna and appropriate circuitry to allow unit 800 to connect to the Internet via a wireless network access point or hotspot. The skilled artisan will appreciate that "Wi-Fi" is a trademark of the Wi-Fi Alliance and the brand name for products using the IEEE 802.11 family of standards. In some cases, a Bluetooth transceiver module 829 coupled to processor 802 includes an antenna and appropriate circuitry to allow unit 800 to connect to other devices via the Bluetooth wireless technology standard. In some cases, an NFC transceiver module 831 coupled to processor 802 includes an antenna and appropriate circuitry to allow unit 800 to establish radio communication via near-field communications.

Operating system (OS) 827 orchestrates the operation of unit 800. Apple's iOS and Google's Android are non-limiting examples of suitable operating systems.

Touch screen 810 coupled to processor 802 is also generally indicative of a variety of input/output (I/O) devices such as a keypad, another type of display, a mouse or other pointing device, and so on, all of which may or may not be present in one or more embodiments. Audio module 818 coupled to processor 802 includes, for example, an audio coder/decoder (codec), speaker, headphone jack, microphone, and so on. Power management system 816 can include a battery charger, an interface to a battery, and so on. Memory 812 is coupled to processor 802. Memory 812 can include, for example, volatile memory such as RAM, and non-volatile memory such as ROM, flash, or any tangible computer-readable recordable storage medium which stores information in a non-transitory manner. Processor 802 will typically also have on-chip memory.

In some cases, fingerprint scanner 837 is coupled to processor 802 for biometric authentication purposes. An appropriate corresponding software application (not separately depicted) may reside in memory 812 in some instances. A digital camera 839 is coupled to processor 802. Camera 839 can optionally be used in conjunction with a facial recognition application 835 in memory 812 for biometric verification. A microphone in audio module 818 can optionally be used in conjunction with a speaker recognition application 833 in memory 812 for biometric verification; a suitable acoustic front end can be provided.

A GPS receiver module 899 coupled to processor 802 includes an antenna and appropriate circuitry to allow device 800 to calculate its position by precisely timing the signals sent by GPS satellites high above the Earth. Corresponding software resides in memory 812.

Memory 812 can also include, for example, a stored PIN for comparison with a PIN entered via touch screen 810; extracted facial features from the legitimate owner of the phone for comparison with facial features extracted from a picture taken by camera 839; extracted fingerprint features from the legitimate owner of the phone for comparison with fingerprint features obtained from a scan carried out by scanner 837; and/or extracted voice features from the legitimate owner of the phone for comparison with voice features extracted from a voice sample obtained from a microphone in audio module 818. Note that elements in FIG. 11 are shown connected directly to processor 802; however, one or more bus structures can be employed in one or more embodiments. Furthermore, elements shown as implemented in software may be implemented at least in part in hardware for speed, if desired.

Browser program 897 in memory 812 deciphers hypertext markup language (html) served out by a server such as system 500 (discussed below) for display on screen 810 or the like.

Application 845 in memory 812 is discussed below.

Every instance need not necessarily have every feature depicted in FIG. 8. For example, some embodiments may primarily use the processor, memory, app 845 and/or browser 897, and biometric authentication capabilities.

Exemplary Remittance System

One non-limiting example of a remittance system 1308 is the MasterCard Send™ personal payments service available from MasterCard International Incorporated, Purchase, N.Y., USA. The MasterCard Send™ personal payments service employs the above-described BANKNET network for messaging, and aspects can be implemented as an "app" that sits on top of BANKNET. The MasterCard Send™ personal payments service allows sending funds from one party to another, and can leverage on BANKNET to transfer messages. Remittance system 1308 can be implemented, for example, using MasterCard Send™ or aspects from a third party provider such as Western Union Holdings, Inc., Meridian and Englewood, Colo., USA or Xoom Corporation (a/k/a Xoom, a PayPal Service), San Francisco, Calif., USA.

Co-assigned U.S. Pat. No. 8,706,633 of Hagmeier, et al. discloses a remittance system with improved service for unbanked individuals; the complete disclosure is expressly incorporated by reference herein in its entirety for all purposes. Co-assigned US Patent Application Publication 2008-0249929 of Hagmeier, et al. discloses a payment card-based remittance system with delivery of anti-money laundering information to originating financial institution; the complete disclosure is expressly incorporated by reference herein in its entirety for all purposes. Co-assigned US Patent Application Publication 2014-0214677 of Hagmeier, et al. discloses a remittance system with improved service for unbanked individuals; the complete disclosure is expressly incorporated by reference herein in its entirety for all purposes.

Exemplary Biometric Authentication System

In a biometric authentication system (e.g., 1310), a biometric credential (e.g., fingerprint, voice print) is stored and a data channel is provided wherein a digitized representation is received of a purported match to the stored biometric credential. An engine (e.g., pattern recognition engine) compares the two to determine if there is a match. Reference is made to James Wayman, Anil Jain, Davide Maltoni, and Dario Maio, Biometric Systems: Technology, Design and Performance Evaluation, ISBN: 978-1-85233-596-0 (Print) 978-1-84628-064-1 (Online), Springer-Verlag London Limited 2005, expressly incorporated by reference herein in its entirety for all purposes.

One or more embodiments advantageously link receipt of a remittance amount with initiation of a bill payment process. As noted, in many countries, overseas remittances are a significant source of income for the recipient. The remittance amount is typically used by the receiver for important purposes such as paying bills, making required monthly payments, and the like. In many cases, bill payment enrollment and/or presentment are fixed and/or automated against the user (e.g., remittance receiver's) financial instrument (e.g., checking or other bank account) on fixed dates. A lack of funds in the recipient's registered instrument (e.g., checking or other bank account) on those dates leads to declines and/or penalty charges, and also impacts credit records negatively for the user(s). In other cases, physical distances between the remittance fund receiver and bill payment authority might lead to a delay in payments.

One or more embodiments leverage and expand upon existing systems and processes to establish a link between remittance fund receipts and payment of bills for the receiver of the remittance upon automated confirmation of successful receipt of funds via a remittance channel. Furthermore, one or more embodiments provide additional options for effectuating funds transfer. In some instances, funds can also be transferred to a payment card of the remittance receiver. Indeed, in one or more embodiments, remittance funds can be received on any channel or account as provided during an enrollment phase. Exemplary payment channels include an account, card, electronic wallet, or the like. Funds can be transferred not merely to someone's bank account but in a variety of ways. Current techniques typically limit remittances to payments to a recipient's bank account; in contrast, one or more embodiments permit crediting a remittance to a prepaid or other card, bank account, electronic wallet, or the like.

Currently, remittance and bill payment are provided by independent service modules. One or more embodiments provide logic which evaluates whether a remittance has been successfully completed such that the funds are available in the account of the recipient; when this condition is satisfied, bill payment is triggered. In current bill payment services, whether associated with a payor's bank account or a third party, the bill payment is typically based on a date when the bill is due or a date that has been programmed. For example, suppose an individual wishes to pay his or her Internet service provider bill. He or she schedules an autopay against his or her bank account, debit card, or credit card. The bill might, for example, be submitted on the $25^{th}$ of every month. Current systems will try to debit the funds on the $25^{th}$ of every month. If no funds are available on $25^{th}$ (e.g., no funds in the bank account or accessible to the debit card, or the credit card open to spend limit is too low), the person's credit score may be hurt because of the transaction decline, and the person may owe penalties. Prior art systems simply do not coordinate bill payment with availability of funds, as in one or more embodiments of the invention. One or more embodiments track whether the remittance was completed successfully (funds were transferred), and once it is confirmed that the funds were transferred successfully, that is when the user (remittance recipient) is prompted to initiate the bill payment. In some embodiments, the linkage of the bill payment service with the remittance is provided by the same entity that operates the remittance system 1308; in other instances, the remittance system 1308 is operated by a third party.

Figure 12:
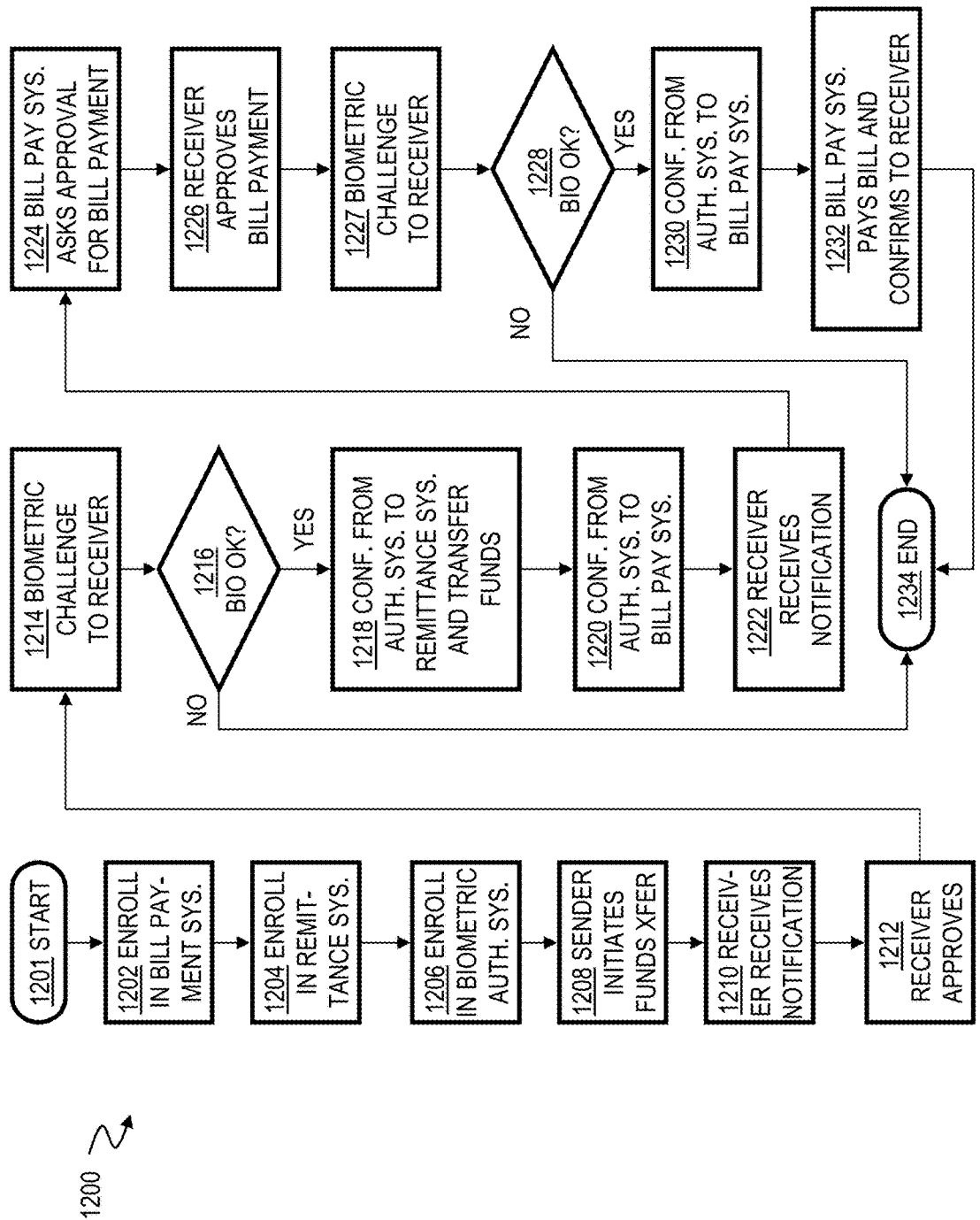
FIG. 12 depicts a flow chart of an exemplary method, according to an aspect of the invention.
Figure 13:
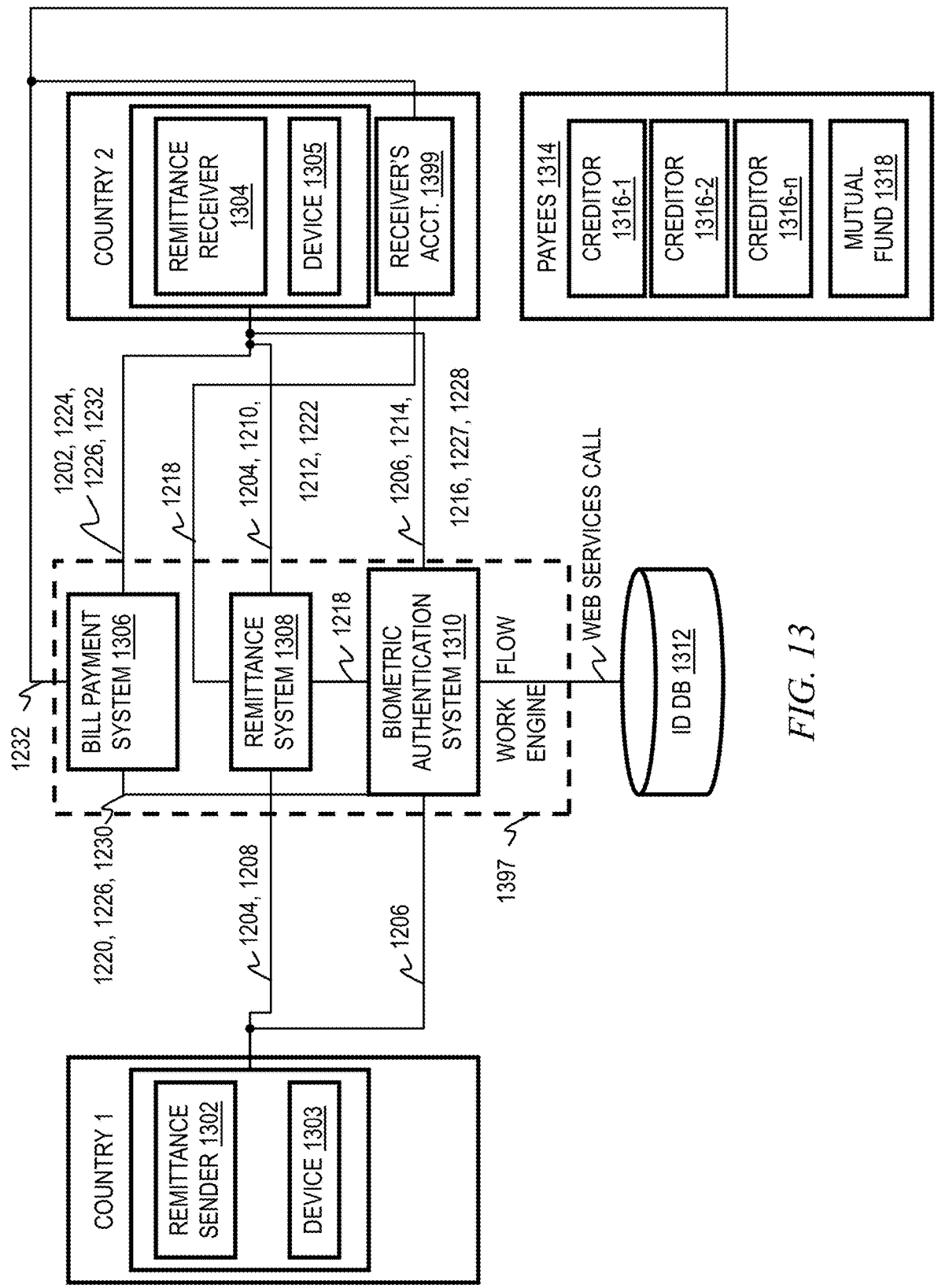
FIG. 13 presents a high-level block diagram, according to an aspect of the invention.

Reference should now be had to FIGS. 12 and 13. FIG. 13 presents a high-level block diagram including a remittance sender 1302 with device 1303 in a first country (Country 1), remittance receiver 1304 with device 1305 in a second country (Country 2), bill payment system 1306, remittance system 1308, biometric authentication system 1310, and a number of payees 1314 to be paid by the receiver 1304 once he or she receives the remittance. Payees 1314 could include creditors 1316-1, 1316-2 . . . 1316-$n$ (generally 1316); a mutual fund 1318; or the like. The connections between the blocks in FIG. 13 are labelled with the corresponding steps from FIG. 12. Payees 1314 are also typically in Country 2.

Please note that the embodiment of FIG. 13, wherein the remittance sender is in Country 1 and the remittance receiver is in Country 2 is a non-limiting exemplary use case—in other embodiments, both the remittance sender and the remittance receiver can be located in the same country/same jurisdiction.

Remittance system 1308 can, as noted, be implemented, for example, using MasterCard Send or aspects from a third party provider such as Western Union Holdings, Inc., Meridian and Englewood, Colo., USA or Xoom Corporation (a/k/a Xoom, a PayPal Service), San Francisco, Calif., USA. Re biometric authentication system 1310, in one or more embodiments, biometric techniques are employed to ensure that the actual user (legitimate intended remittance funds recipient) is initiating the bill payment transaction after receipt of the remittance. Any form of challenge can be employed; alternative embodiments are not limited to biometric challenges; e.g., static PIN/password or OTP (one-time password). In one or more embodiments, the biometric authentication system 1310 includes a stored biometric credential (e.g., fingerprint, voice print) and a data channel wherein a digitized representation is received of a purported match to the stored biometric credential. An engine compares the two to determine if there is a match. Some embodiments use an app, provided by an entity such as MasterCard International Incorporated, for both sender and receiver, which app connects to an authentication system (e.g., 1310), operated by the same entity that provides the app, to authenticate the biometric credentials of the participants. The biometric credentials can be stored by that entity, or in cases of countries that have a national identity database (e.g., Unique Identification Authority of India (UIDAI)), those stored governmental credentials can be employed by the authentication system. Thus, biometric authentication system 1310 can be provided by an entity such as MasterCard International Incorporated, provided by a third party vendor, provided by a government program, or a combination (e.g., entity such as MasterCard International Incorporated or third party uses stored government credentials). Completed authentication can, in one or more embodiments, be taken as a proof that the funds were transferred. Of course, use of biometric credentials or the like, whether governmental or otherwise, should always be in full compliance with all applicable laws, rules, regulations, policies, and procedures. For an example, an opt-in process can be employed.

In some embodiments, an entity such as MasterCard International Incorporated is the remittance provider; in another aspect, there is a third party remittance provider such as Western Union or Xoom or PayPal. These third parties could provide their own apps 845 on the phone and an entity such as MasterCard International Incorporated could provide an authentication service to complete the remittance process. If an entity such as MasterCard International Incorporated is managing the complete end-to-end cycle, there will be a suitable app (e.g., 845) on the sender system and on the receiver system. On the sender system, the app will add the recipients and determine the amount of the transfer and proceed with the transfer. On the recipient system, the app will perform multiple functions; e.g.: (i) confirm receipt of funds; and (ii) trigger bill payment after funds have been received (i.e., obtain approval to initiate bill payment after funds have been received). A server based implementation can also be employed, or functionality can be split between app and server.

In addition to or in lieu of app 845, browser 897 of device 800 can execute hypertext markup language (html) or the like served out by a remote server over a wireless network, to implement functionality similar to that described with respect to the mobile app.

Non-limiting examples of bill payment systems 1306 have been discussed above with regard to FIG. 3.

FIG. 12 depicts a flow chart of an exemplary method 1200, beginning at 1201, according to an aspect of the invention. Step 1202 includes enrollment in the bill payment system 1306, wherein the receiver 1304 of the remittance funds registers the details of one or more accounts (of payees 1314) for which one or more bills need to be paid on a monthly or other specified periodic basis (e.g., creditors 1316 such as electricity bill, telephone bill, non-bill recurring payment such as mutual fund investment 1318, etc.). Step 1204 includes enrollment to the remittance system 1308 by payer 1302 and payee 1304. In a non-limiting example, this step is managed by the biometric authentication system 1310. For example, enrollment of the receiver is done against the receiver's biometric records, managed either by a government system, the receiver's issuer, or by an entity such as MasterCard International Incorporated on behalf of the receiver's issuer. Advantageously, this provides proof of life of the receiver at the time of receipt of funds, which also allows downstream actions such as initiation of bill pay activity. For proof of life, biometric authentication is preferred due to enhanced security; however, other techniques such as a static password could be used in other embodiments.

Step 1206 includes enrollment of the biometric credential(s) of some, and preferably, all the interacting parties into the biometric authentication system 1310 or the like. In a non-limiting example, the biometric credentials of the receiver 1304 are used to verify the receiver 1304 for purposes of verifying receipt of funds. Enrollment of the sender of funds 1302 is appropriate in one or more embodiments to address concerns such as anti-money-laundering (AML) and the like. Currently, if a person has a bank account and wants to transfer out some money or carry out a bill payment, he or she must enroll the recipient of the funds. In one or more embodiments, a service provider supports the remittance services; the service provider does not "know" the parties. The service provider prefers that the parties go through appropriate steps including compliance with know your customer (KYC) and AML. Furthermore, the service provider, whether an independent third party provider or an entity such as MasterCard International Incorporated, wants to authenticate the remittance sender 1302, so as to know that he or she is really the one who initiated the transfer of funds. The remittance sender 1302 enrolls himself or herself, as well as the recipient(s) 1304 of the funds.

In cases where the biometric credential(s) are available over a national ID database 1312, the biometric authentication system 1310 can leverage use of such a database via a web service call or the like to validate the identity of the participants; of course, subject to opt-in or other appropriate privacy protections. Steps 1202-1206 are thus addressed to an enrollment aspect.

Note that optionally, when the system is sponsored by an entity such as MasterCard International Incorporated, the BANKNET can be used for debit and credit of funds associated with MasterCard-branded assets such as cards or wallets. However, other channels can be used in other embodiments.

Note that non-limiting examples of biometric credentials include fingerprints, voiceprints, an iris scan, selfie photos with facial recognition software, and the like. Non-limiting examples of fingerprint recognition technologies include TouchID® fingerprint identity sensor for the Apple Pay® mobile payments solution (registered marks of Apple Inc., Cupertino, Calif., USA) and Samsung® Pay (registered mark of SAMSUNG ELECTRONICS CO., LTD. Gyeonggi-do, REPUBLIC OF KOREA). Some embodiments authenticate using an app on a mobile phone or other mobile device as in FIG. 11; in other cases, the stored credentials reside on a server under control of an entity such as MasterCard International Incorporated. Many different approaches are possible. In some embodiments, an app is sponsored by an entity such as MasterCard International Incorporated or a third party remittance service provider on a user device which performs the biometric authentication. Other embodiments leverage an "on-cloud" authentication mode. The cloud implementation could employ, for example, a cloud hosted cloud by an entity such as MasterCard International Incorporated; a government-hosted cloud or an issuer cloud having biometric credentials. An authentication app can reside on a mobile device 800 and/or can have a server-based aspect. In one embodiment, both sender 1302 and receiver 1304 have apps on their phones or other devices. In another embodiment, only the receiver 1304 has the app. There can be a corresponding server component in some implementations (e.g., on a server such as system 500 with wireless network connectivity to the client device). For example, suppose the app is provided by a third party provider and an entity such as MasterCard International Incorporated only supports authentication for the app—in such a case, the server data can be used to implement the logic of bill payment.

In step 1208, following enrollment in the remittance system, the sender 1302 of the money initiates the funds transfer from his or her foreign location (Country 1). In step 1210, the receiver 1304 receives notification on his or her enrolled device 1305 (e.g., tablet or mobile phone 800 or other suitable device) regarding a fund credit request, together with presentment of a biometric authentication challenge to complete the fund credit process. In one or more embodiments, device enrollment implies providing mobile or other suitable contact number for a device on which the user will be installing the app and/or receiving notification, receiving and responding to the challenge to complete the authentication and transfer process.

In step 1212, the receiver 1304 approves the notification to initiate the biometric challenge (in general, actions performed by the sender 1302 can be with the aid of his or her device 1303 and actions performed by the receiver 1304 can be with the aid of his or her device 1305). In step 1214, the biometric authentication system 1310 sends a biometric challenge to the receiver's device 1305. In step 1216, the receiver completes the biometric challenge successfully (the credentials input by receiver 1304 are successfully checked against stored credentials from enrollment as per the YES branch; otherwise the process is terminated as per the NO branch to END block 1234). In step 1218, the biometric authentication system 1310 sends confirmation of successful authentication to the remittance system 1308 to initiate the credit of funds, and the remittance system credits the funds to the receiver's registered (enrolled) account 1399.

In step 1220, the biometric authentication system 1310 also sends confirmation to the bill payment system 1306 (e.g., as a web service) indicating that the authentication challenge for the remittance was successfully completed, to trigger the bill payment process (effectively providing provide "proof of life" for initiating downstream bill pay activities at periodic intervals). Again, while biometric authentication is preferred, a personal identification number (PIN) or security questions could be used in other embodiments. In step 1222, the user 1304 receives notification from the remittance system 1308 that funds have been successfully credited to the enrolled channel 1399. In step 1224, the bill payment system 1306 sends notification to the user-enrolled device 1305 asking approval for initiating the pending bill payment(s) for the pertinent period(s). In step 1226, the user 1304 approves the notification post which causes the bill payment system 1306 to ask the biometric authentication system 1310 to send a biometric challenge to the cardholder's enrolled device 1305, in step 1227. In step 1228, the receiver 1304 completes the biometric challenge successfully (as per the YES branch to step 1230; otherwise the process is terminated as per the NO branch to END block 1234). In step 1230, the biometric authentication system 1310 sends confirmation of successful authentication to the bill payment system 1306. In step 1232, in response, the bill payment system 1306 pays the bill (e.g., debits checking account or other enrolled account 1399 of receiver 1304 and credits account(s) of payee(s) 1314) and sends confirmation of receipt to the cardholder 1304 on his or her enrolled device 1305. Processing ends at 1234.

One or more embodiments advantageously allow wider acceptance of modern technologies such as electronic bill presentment and/or payment, home send (generally, MasterCard Send™ or aspects from a third party provider such as Western Union Holdings, Inc., Xoom Corporation and the like), by providing convenience to the cardholder for automating the funds receipt and disbursement process and avoiding financial penalties for non-payment and/or attempted payment on an instrument with no funds.

One or more embodiments employ biometric authentication, a remittance system, and/or a bill pay system, all provided by an entity such as MasterCard International Incorporated, or, e.g., provided in part by an entity such as MasterCard International Incorporated in part by one or more third parties, and allow processing transactions on a suitable payment processing network (e.g., the BANKNET network or other payment card network).

Thus, one or more embodiments address the problem of late payments in the remittance receivables market; for example, a bill payment for services or other forms of monetary delivery where recipient 1304 needs to accomplish something in the home country (Country 2). Delays in payment and/or idle funds in remittance financial accounts lead to penalties, charges, and/or bad marks on the credit history. One or more embodiments reduce the chances of such a negative impact via a triggering process. As soon as the recipient 1304 in the home country receives the funds from his or her relatives or other remittance sources 1302 abroad, this triggers a bill payment to the creditor(s) or other payees 1314 of the recipient in the home country.

In one or more embodiments, the recipient 1304 in the home country registers the payees (e.g. service provider(s) or other creditor(s); mutual fund, etc.) to whom it needs to make bill payments or other payments and the recipient also needs to authenticate himself or herself to confirm receipt of the funds. The authentication is recorded and triggers the bill payment(s) to the previously-registered payees. This reduces the chance of late payment fees, loss of credit rating, etc. One or more embodiments, as noted, can be applied in the field of automatic investments; e.g., placing funds right into the investment vehicle (e.g., mutual fund 1318) as soon as received rather than having them languish in the checking account (e.g., 1399).

It will be appreciated that in one or more embodiments, receiver 1304 has an account 1399 in which he or she expects to receive some funds. Receipt of the funds triggers an automatic action; e.g., pay a bill, invest the money, etc. In a non-limiting example, the first leg of the cycle is receipt of funds from the remittance; the process does not proceed unless that leg has been successfully completed. This success is validated through authentication by the remittance receiver. Then, the downstream activities (e.g., bill payments) are triggered.

In one or more embodiments, the overall system is database-driven. A certain set of rules are defined, in turn identifying the enrollment system(s); the enrolled users, and the like. In some cases, the feed or the input is provided by the authentication system 1310 which authenticates the cardholder (or other remittance sender 1302 and/or receiver 1304) on the first leg. System 1310 sends a feed, and based on the rules, the system will consume that feed and trigger downstream activity. Furthermore in this regard, there are several aspects relating to database-driven systems. In one aspect, the pertinent participant information, such as who is the sender, who is the receiver, who has been added as a receiver, how the parties will be authenticated, the biometric credentials, and the like, are stored in a suitable database (e.g., in database 1312 or part in database 1312 and part elsewhere) or other data repository. In another aspect, a workflow engine 1397 links together and drives the appropriate systems and flows. Engine 1397 can include computational and/or other logical capability which looks into the data repository to determine whether there has been a fund transfer; if there has been a fund transfer and it has been successfully completed, then, initiate the bill payment. Bill payment data may be stored, for example, in a separate data repository including identification of the recipient of the funds, identification of the enrolled payees (e.g., electric company, telephone company, Internet service provider, and the like).

Many different ways can be used to transfer funds to the receiver 1304. In some instances the system uses a special payment transaction to put funds on to the card of the receiver 1304 (e.g., ISO-8583 message type 0100 with transaction type twenty eight, or an ISO-8583 message type 0200 with transaction type twenty eight), such as the MasterCard MONEYSEND Payment Transaction. See, e.g., co-assigned US Patent Publication 2016/0034889 of Downs; Edward F. et al., APPARATUS, METHOD, AND COMPUTER PROGRAM PRODUCT FOR AUTOMATED SEQUENTIAL ELECTRONIC PAYMENTS, the complete disclosure of which is expressly incorporated herein by reference in its entirety for all purposes.

Given the discussion thus far, it will be appreciated that, in general terms, an exemplary method includes the step of obtaining an indication that a remittance has at least been initiated to (e.g., initiated but not yet received or initiated and received) in a financial account 1399 (e.g., bank account, payment card account, electronic wallet, or the like) of a receiver 1304. (Non-limiting exemplary manners of obtaining the indication are discussed in the following paragraph.) A further step (e.g. 1232) includes, responsive to obtaining the indication, automatically paying at least one payee 1314 from the financial account 1399. In one non-limiting use case, the remittance is from a first jurisdiction (Country 1) and is received in a second jurisdiction (Country 2). In such cases, the at least one payee can also be in the second jurisdiction. In other embodiments, there is only a single jurisdiction involved; the remittance is domestic.

Regarding the indication that the remittance has at least been initiated to the financial account 1399 of the receiver 1304, in some embodiments, when an entity such as MasterCard International Incorporated is the remittance provider, the remittance system 1308, bill payment system 1306, and the logic of the present system (e.g., workflow engine 1397) all reside within the systems of an entity such as MasterCard International Incorporated, successful completion of the authentication (YES block of 1216) can be used as an indication of the remittance at least being initiated. Alternatively, the remittance system 1308 sends a notification to the present system (e.g., workflow engine 1397) indicating that the remittance for this particular account has been completed successfully. Alternatively, if a third party provider (e.g. Western Union) is leveraging an authentication system provided by an entity such as MasterCard International Incorporated to complete the remittance part, successful authentication can be used as a proof of at least successful remittance initiation to initiate the bill payment.

In some cases, further steps include obtaining, from the receiver, an enrollment of the receiver in a biometric authentication system 1310 as in step 1206, and challenging the receiver with a pre-remittance biometric challenge, as in step 1214 from the biometric authentication system prior to effectuating the remittance. Successful completion of the pre-remittance biometric challenge (YES branch of block 1216) by the receiver is taken as the indication that the remittance has at least been initiated to the financial account of the receiver. For example, the indication is obtained by the biometric authentication system 1310 signaling bill pay system 1306 (which automatically pays the at least one payee), using workflow engine 1397.

Various authentication possibilities have been discussed. In one aspect, enroll a mobile device 1305 of the receiver; provide a mobile application 845 to the mobile device of the receiver; and carry out the pre-remittance biometric challenge with the mobile application.

In some instances, a further step 1202 includes obtaining, from the receiver 1304, an enrollment of the at least one payee 1314—in such cases, the paying of the at least one payee is based on the enrollment. The receiver may, for example, enroll the at least one payee in the bill payment system 1306.

As note, in some instances, the sender enrolls himself or herself, the sender enrolls the receiver, and then the receiver enrolls the bill payees into the bill payment system.

In one or more embodiments, further steps include challenging the receiver with a pre-bill payment biometric challenge 1227 from the biometric authentication system prior to automatically paying the at least one payee. In such embodiments, the automatic paying of the at least one payee is responsive to successful completion of the pre-bill payment biometric challenge by the receiver (YES branch of block 1228).

In some cases, a further step 1218 includes effectuating the remittance to the financial account of the receiver. In such instances, effectuating the remittance is responsive to successful completion of the pre-remittance biometric challenge by the receiver, as per the YES branch of block 1216.

One or more embodiments further include obtaining receiver approval for the remittance, as at 1212; in such embodiments, the pre-remittance biometric challenge 1214 is responsive to the receiver approval for the remittance.

One or more embodiments further include obtaining receiver approval for the automatic paying of the at least one payee, as at 1226; in such embodiments, the pre-bill payment biometric challenge 1227 is responsive to the receiver approval for the automatic paying of the at least one payee.

It will thus be appreciated that blocks 1212 and 1226 could also be depicted as decision blocks wherein approval results in logical flow to the next step while disapproval results in logical flow to the END block 1234.

In another aspect, an exemplary system includes a bill payment system 1306, a remittance system 1308, an authentication system (e.g., biometric authentication system 1310), and a workflow engine 1397 which couples the bill payment system, the remittance system, and the authentication system. The remittance system sends a remittance to a financial account 1399 of a receiver 1304. Prior to the remittance system sending the remittance, the authentication system 1310 challenges the receiver with a pre-remittance biometric challenge, as at 1214. Successful completion of the pre-remittance biometric challenge (YES branch of block 1216) by the receiver is signaled by the authentication system 1310 to the bill payment system 1306 via the workflow engine 1397, as at 1220. Responsive to the signal, the bill payment system 1306 automatically pays at least one payee from the financial account (optionally, the additional steps 1224-1228 are carried out first with a successful completion of another biometric authentication at the YES branch of block 1228).

The bill payment system, in some cases, stores enrollment data for the at least one payee, obtained from the receiver, and pays the at least one payee based on the enrollment data.

In some instances, a web services link to an external biometric credential database 1312 is provided.

One or more embodiments include provision of a system; the system includes distinct software modules, and each of the distinct software modules is embodied on a non-transitory computer-readable storage medium. In some cases, the distinct software modules include distinct modules to implement the workflow engine and systems in FIG. 13.

System and Article of Manufacture Details

Embodiments of the invention can employ hardware and/or hardware and software aspects. Software includes but is not limited to firmware, resident software, microcode, etc.

Software might be employed, for example, in connection with one or more of modules to implement at least a portion of one or more of the elements of the system of FIG. 13; a terminal 122, 124, 125, 126; a reader 132; a host, server, and/or processing center 140, 142, 144 (optionally with data warehouse 154) of a merchant, issuer, acquirer, processor, other third party, or operator of a network 2008 and/or system 1006; and the like. Firmware might be employed, for example, in connection with payment devices such as cards 102, 112, as well as reader 132.

FIG. 5 is a block diagram of a system 500 that can implement part or all of one or more aspects or processes of the invention. As shown in FIG. 5, memory 530 configures the processor 520 (which could correspond, e.g., to processor portions 106, 116, 130; a processor of a terminal or a reader 132; processors of remote hosts in centers 140, 142, 144; processors of a merchant, issuer, acquirer, processor, other third party, or operator of a network 2008 and/or systems 1006, 1306, 1308, 1310; and the like); to implement one or more aspects of the methods, steps, and functions disclosed herein (collectively, shown as process 580 in FIG. 5). Different method steps can be performed by different processors. The memory 530 could be distributed or local and the processor 520 could be distributed or singular. The memory 530 could be implemented as an electrical, magnetic or optical memory, or any combination of these or other types of storage devices (including memory portions as described above with respect to cards 102, 112). It should be noted that if distributed processors are employed, each distributed processor that makes up processor 520 generally contains its own addressable memory space. It should also be noted that some or all of computer system 500 can be incorporated into an application-specific or general-use integrated circuit. For example, one or more method steps could be implemented in hardware in an application specific integrated circuit (ASIC) or field programmable gate array (FPGA) rather than using firmware. Display 540 is representative of a variety of possible input/output devices (e.g., displays, printers, keyboards, mice, touch screens, touch pads, and so on).

As is known in the art, part or all of one or more aspects of the methods and apparatus discussed herein may be distributed as an article of manufacture that itself comprises a tangible computer readable recordable storage medium having computer readable code means embodied thereon. The computer readable program code means is operable, in conjunction with a computer system, to carry out all or some of the steps to perform the methods or create the apparatuses discussed herein. A computer-usable medium may, in general, be a recordable medium (e.g., floppy disks, hard drives, compact disks, EEPROMs, or memory cards) or may be a transmission medium (e.g., a network comprising fiber-optics, the world-wide web, cables, or a wireless channel using time-division multiple access, code-division multiple access, or other radio-frequency channel). Any medium known or developed that can store information suitable for use with a computer system may be used. The computer-readable code means is any mechanism for allowing a computer to read instructions and data, such as magnetic variations on a magnetic medium or height variations on the surface of a compact disk. The medium can be distributed on multiple physical devices (or over multiple networks). For example, one device could be a physical memory media associated with a terminal and another device could be a physical memory media associated with a processing center. As used herein, a tangible computer-readable recordable storage medium is defined to encompass a recordable medium (non-transitory storage), examples of which are set forth above, but does not encompass a transmission medium or disembodied signal.

The computer systems and servers described herein each contain a memory that will configure associated processors to implement the methods, steps, and functions disclosed herein. Such methods, steps, and functions can be carried out, by way of example and not limitation, by processing capability on one, some, or all of elements 122, 124, 125, 126, 140, 142, 144, 2004, 2006, 2008, 2010; on a computer implementing aspects of network 2008 and/or systems 1006, 1306, 1308, 1310; on processors of hosts and/or servers of other parties described herein; on a computer implementing functionality as in FIG. 13; and the like. The memories could be distributed or local and the processors could be distributed or singular. The memories could be implemented as an electrical, magnetic or optical memory, or any combination of these or other types of storage devices. Moreover, the term "memory" should be construed broadly enough to encompass any information able to be read from or written to an address in the addressable space accessed by an associated processor. With this definition, information on a network is still within a memory because the associated processor can retrieve the information from the network.

Thus, elements of one or more embodiments of the invention, such as, for example, 122, 124, 125, 126, 140,

142, 144, 2004, 2006, 2008, 2010; a computer implementing aspects of network 2008 and/or systems 1006, 1306, 1308, 1310; hosts and/or servers of other parties described herein; a computer implementing functionality as in FIG. 13; and the like, can make use of computer technology with appropriate instructions to implement method steps described herein. Some aspects can be implemented, for example, using one or more servers which include a memory and at least one processor coupled to the memory. The memory could load appropriate software. The processor can be operative to perform one or more method steps described herein or otherwise facilitate their performance.

Accordingly, it will be appreciated that one or more embodiments of the invention can include a computer program product comprising computer program code means adapted to perform one or all of the steps of any methods or claims set forth herein when such program is run on a computer, and that such program may be embodied on a computer readable medium. Further, one or more embodiments of the present invention can include a computer comprising code adapted to cause the computer to carry out one or more steps of methods or claims set forth herein, together with one or more apparatus elements or features as depicted and described herein.

As used herein, including the claims, a "server" includes a physical data processing system (for example, system 500 as shown in FIG. 5) running a server program. It will be understood that such a physical server may or may not include a display, keyboard, or other input/output components. A "host" includes a physical data processing system (for example, system 500 as shown in FIG. 5) running an appropriate program.

Furthermore, it should be noted that any of the methods described herein can include an additional step of providing a system comprising distinct software modules embodied on one or more tangible computer readable storage media. All the modules (or any subset thereof) can be on the same medium, or each can be on a different medium, for example. The modules can include any or all of the components shown in the figures. Referring again to FIG. 13, in one or more embodiments, the modules include logic within the workflow engine 1397 which monitors that everything is going smoothly in the flow chart of FIG. 12—this logic confirms funds transfer and funds availability, as well as the amount of the transfer (must be non-zero in one or more embodiments; zero transfers (e.g., for test purposes) might be permitted in other embodiments). The method steps can be carried out using the distinct software modules of the system, as described above, executing on the one or more hardware processors. Further, a computer program product can include a tangible computer-readable recordable storage medium with code adapted to be executed to carry out one or more method steps described herein, including the provision of the system with the distinct software modules.

Thus, aspects of the invention can be implemented, for example, by one or more appropriately programmed general purpose computers, such as, for example, servers, mobile devices, or personal computers, located at one or more of the entities in the figures, as well as within the payment network 2008 and/or payment system 1006 and/or systems 1306, 1308, 1310. Such computers can be interconnected, for example, by one or more of payment network 2008, another VPN, the Internet, a local area and/or wide area network (LAN and/or WAN), via an EDI layer, and so on. Note that element 2008 represents both the network and its operator. The computers can be programmed, for example, in compiled, interpreted, object-oriented, assembly, and/or machine languages, for example, one or more of C, C++, Java, Visual Basic, COBOL, Assembler, Structured Query Language (SQL), and the like (an exemplary and non-limiting list), and can also make use of, for example, Extensible Markup Language (XML), known application programs such as relational database applications (e.g., IBM DB2® software available from International Business Machines Corporation, Armonk, N.Y., US; SAS® software available from SAS Institute, Inc., Cary, N.C., US), spreadsheets (e.g., MICROSOFT EXCEL® software available from Microsoft Corporation, Redmond, Wash., US), and the like. The computers can be programmed to implement the logic and/or data flow depicted in the figures. In some instances, messaging and the like may be in accordance with the International Organization for Standardization (ISO) Specification 8583 *Financial transaction card originated messages—Interchange message specifications* and/or the ISO 20022 or UNIFI Standard for Financial Services Messaging, also incorporated herein by reference in its entirety for all purposes. In one or more embodiments, some messages may be in accordance with NACHA Automated Clearing House (ACH) rules and regulations.

Although illustrative embodiments of the invention have been described herein with reference to the accompanying drawings, it is to be understood that the invention is not limited to those precise embodiments, and that various other changes and modifications may be made by one skilled in the art without departing from the scope or spirit of the invention.

What is claimed is:

1. A system comprising:
  a bill payment system;
  a remittance system;
  an authentication system, which comprises a biometric authentication system;
  a web services link to an external biometric credential database; and
  a workflow engine which couples said bill payment system, said remittance system, and said authentication system;
  wherein:
  said remittance system sends a remittance to a financial account of a receiver;
  prior to said remittance system sending said remittance, said authentication system challenges said receiver with a pre-remittance biometric challenge and receives, via said biometric authentication system, a biometric signal in response to said biometric challenge;
  said authentication system reports successful completion of said pre-remittance biometric challenge by said receiver by sending a completion signal to said bill payment system via said workflow engine;
  said bill payment system stores enrollment data for said at least one payee, obtained from said receiver, and automatically pays said at least one payee from said financial account based on said enrollment data, responsive to said completion signal.

* * * * *